(12) United States Patent
Chiu et al.

(10) Patent No.: US 11,765,380 B2
(45) Date of Patent: Sep. 19, 2023

(54) METHODS AND SYSTEMS FOR MOTION VECTOR DERIVATION AT A VIDEO DECODER

(71) Applicant: Tahoe Research, Ltd., Dublin (IE)

(72) Inventors: Yi-Jen Chiu, San Jose, CA (US); Lidong Xu, Beijing (CN); Hong Jiang, El Dorado Hills, CA (US)

(73) Assignee: Tahoe Research, Ltd., Dublin (IE)

( * ) Notice: Subject to any disclaimer, the term of this patent is extended or adjusted under 35 U.S.C. 154(b) by 225 days.

(21) Appl. No.: 17/107,396

(22) Filed: Nov. 30, 2020

(65) Prior Publication Data

US 2021/0084327 A1   Mar. 18, 2021

Related U.S. Application Data

(63) Continuation of application No. 16/552,995, filed on Aug. 27, 2019, now Pat. No. 10,863,194, which is a continuation of application No. 15/960,120, filed on Apr. 23, 2018, now Pat. No. 10,404,994, which is a continuation of application No. 14/737,437, filed on Jun. 11, 2015, now Pat. No. 9,955,179, which is a
(Continued)

(51) Int. Cl.
*H04N 19/52* (2014.01)
*H04N 19/44* (2014.01)
*H04N 19/577* (2014.01)
*H04N 19/56* (2014.01)
*H04N 19/51* (2014.01)

(52) U.S. Cl.
CPC ............ *H04N 19/52* (2014.11); *H04N 19/44* (2014.11); *H04N 19/51* (2014.11); *H04N 19/56* (2014.11); *H04N 19/577* (2014.11)

(58) Field of Classification Search
None
See application file for complete search history.

(56) References Cited

U.S. PATENT DOCUMENTS

| 4,383,272 A | 5/1983 | Netravali et al. |
| 4,466,714 A | 8/1984 | Dyfverman |
| 4,862,259 A | 8/1989 | Gillard |

(Continued)

FOREIGN PATENT DOCUMENTS

| CN | 1450809 | 10/2003 |
| CN | 1961582 | 5/2007 |

(Continued)

OTHER PUBLICATIONS

Combined Search and Examination Report for United Kingdom Patent Application No. 1100658.2 dated May 16, 2011, 6 pages.
(Continued)

*Primary Examiner* — Saba Tsegaye
(74) *Attorney, Agent, or Firm* — Studebaker & Brackett PC

(57) ABSTRACT

Method and apparatus for deriving a motion vector at a video decoder. A block-based motion vector may be produced at the video decoder by utilizing motion estimation among available pixels relative to blocks in one or more reference frames. The available pixels could be, for example, spatially neighboring blocks in the sequential scan coding order of a current frame, blocks in a previously decoded frame, or blocks in a downsampled frame in a lower pyramid when layered coding has been used.

12 Claims, 14 Drawing Sheets

Related U.S. Application Data continuation of application No. 12/567,540, filed on Sep. 25, 2009, now Pat. No. 9,654,792.

(60) Provisional application No. 61/222,984, filed on Jul. 3, 2009.

(56) References Cited

U.S. PATENT DOCUMENTS

| | | | |
|---|---|---|---|
| 4,862,260 A | 8/1989 | Harradine et al. |
| 4,864,393 A | 9/1989 | Harradine et al. |
| 4,864,398 A | 9/1989 | Avis et al. |
| 4,865,394 A | 9/1989 | Gillard |
| 4,967,271 A | 10/1990 | Campbell et al. |
| 5,313,281 A | 5/1994 | Richards |
| 5,398,068 A | 3/1995 | Liu et al. |
| 5,410,358 A | 4/1995 | Shackleton et al. |
| 5,467,086 A | 11/1995 | Jeong |
| 5,546,477 A | 8/1996 | Knowles et al. |
| 5,568,200 A | 10/1996 | Pearlstein et al. |
| 5,592,226 A | 1/1997 | Lee et al. |
| 5,615,287 A | 3/1997 | Fu et al. |
| 5,642,239 A | 6/1997 | Nagai |
| 5,677,735 A | 10/1997 | ueno et al. |
| 5,699,499 A | 12/1997 | Kawada et al. |
| 5,734,435 A | 3/1998 | Wilson et al. |
| 5,742,343 A | 4/1998 | Haskell et al. |
| 5,748,248 A | 5/1998 | Parke |
| 5,786,864 A | 7/1998 | Yamamoto |
| 5,831,677 A | 11/1998 | Streater |
| 5,838,828 A | 11/1998 | Mizuki et al. |
| 5,943,090 A | 8/1999 | Eiberger et al. |
| 5,943,444 A | 8/1999 | Shimizu et al. |
| 5,974,177 A | 10/1999 | Krtolica |
| 5,995,154 A | 11/1999 | Heimburger |
| 5,999,173 A | 12/1999 | Ubillos |
| 6,014,473 A | 1/2000 | Hossack et al. |
| 6,058,142 A | 5/2000 | Ishikawa et al. |
| 6,067,321 A | 5/2000 | Lempel |
| 6,072,833 A | 6/2000 | Yamauchi |
| 6,081,554 A | 6/2000 | Lee et al. |
| 6,084,908 A | 7/2000 | Chiang et al. |
| 6,125,144 A | 9/2000 | Matsumura et al. |
| 6,130,912 A | 10/2000 | Chang et al. |
| 6,141,449 A | 10/2000 | Kawada et al. |
| 6,148,109 A | 11/2000 | Boon |
| 6,157,396 A | 12/2000 | Margulis et al. |
| 6,181,382 B1 | 1/2001 | Kieu et al. |
| 6,185,329 B1 | 2/2001 | Zhang et al. |
| 6,208,760 B1 | 3/2001 | De Haan et al. |
| 6,222,885 B1 | 4/2001 | Chaddha et al. |
| 6,256,068 B1 | 7/2001 | Takada et al. |
| 6,289,052 B1 | 9/2001 | Faryar et al. |
| 6,408,096 B2 | 6/2002 | Tan |
| 6,421,386 B1 | 7/2002 | Chung et al. |
| 6,519,005 B2 | 2/2003 | Bakhmutsky et al. |
| 6,556,197 B1 | 4/2003 | Van Hook et al. |
| 6,556,718 B1 | 4/2003 | Piccinelli et al. |
| 1,450,809 A1 | 10/2003 | Lee |
| 6,654,420 B1 | 11/2003 | Snook |
| 6,690,728 B1 | 2/2004 | Chang et al. |
| 6,707,367 B2 | 3/2004 | Castaneda et al. |
| 6,765,964 B1 | 7/2004 | Conklin |
| 6,807,231 B1 | 10/2004 | Wiegand et al. |
| 7,010,279 B2 | 3/2006 | Rofougaran |
| 7,023,921 B2 | 4/2006 | Subramaniyan et al. |
| 7,133,451 B2 | 11/2006 | Kim et al. |
| 7,248,844 B2 | 7/2007 | Rofougaran |
| 7,259,649 B2 | 8/2007 | Ancey et al. |
| 7,260,148 B2 | 8/2007 | Sohm |
| 7,289,672 B2 | 10/2007 | Sun et al. |
| 7,336,720 B2 | 2/2008 | Martemyanov et al. |
| 7,463,687 B2 | 12/2008 | Subramaniyan et al. |
| 7,526,256 B2 | 4/2009 | Bhatti et al. |
| 7,590,180 B2 | 9/2009 | Kang |
| 7,616,692 B2 | 10/2009 | Holcomb et al. |
| 7,683,851 B2 | 3/2010 | Rofougaran et al. |
| 7,751,482 B1 | 7/2010 | Srinivasan et al. |
| 7,764,740 B2 | 7/2010 | Seok et al. |
| 7,890,066 B2 | 2/2011 | Rofougaran et al. |
| 8,107,748 B2 | 1/2012 | Miao et al. |
| 8,233,538 B2 | 7/2012 | Sun et al. |
| 8,238,421 B2 | 8/2012 | Choi et al. |
| 8,279,018 B1 | 10/2012 | Song et al. |
| 8,279,927 B2 | 10/2012 | Sun et al. |
| 8,295,551 B2 | 10/2012 | Lertrattanapanich et al. |
| 8,331,450 B2 | 12/2012 | Sun et al. |
| 8,462,852 B2 | 6/2013 | Xu et al. |
| 8,494,054 B2 | 7/2013 | Nair et al. |
| 8,519,814 B2 | 8/2013 | Feng et al. |
| 9,060,175 B2 * | 6/2015 | Wang .................. H04N 19/176 |
| 2002/0175320 A1 | 11/2002 | Heun et al. |
| 2002/0176500 A1 | 11/2002 | Bakhmutsky et al. |
| 2003/0031128 A1 | 2/2003 | Kim et al. |
| 2003/0063671 A1 | 4/2003 | Song |
| 2003/0063673 A1 | 4/2003 | Riemens et al. |
| 2003/0095603 A1 | 5/2003 | Lan et al. |
| 2003/0103568 A1 | 6/2003 | Lee et al. |
| 2003/0189981 A1 | 10/2003 | Lee |
| 2004/0046891 A1 | 3/2004 | Mishima et al. |
| 2004/0114688 A1 | 6/2004 | Kang |
| 2004/0223548 A1 | 11/2004 | Kato et al. |
| 2004/0258154 A1 | 12/2004 | Liu et al. |
| 2005/0018772 A1 | 1/2005 | Sung et al. |
| 2005/0135481 A1 | 6/2005 | Sung et al. |
| 2005/0220190 A1 | 10/2005 | Ha et al. |
| 2005/0259736 A1 | 11/2005 | Payson |
| 2005/0286777 A1 | 12/2005 | Kumar et al. |
| 2006/0017843 A1 | 1/2006 | Shi et al. |
| 2006/0018383 A1 | 1/2006 | Shi et al. |
| 2006/0109905 A1 | 5/2006 | Seok et al. |
| 2006/0120613 A1 | 6/2006 | Su et al. |
| 2006/0126952 A1 | 6/2006 | Suzuki et al. |
| 2006/0203904 A1 | 9/2006 | Lee et al. |
| 2006/0215761 A1 | 9/2006 | Shi et al. |
| 2007/0053440 A1 | 3/2007 | Hsieh et al. |
| 2007/0064803 A1 | 3/2007 | Miao et al. |
| 2007/0064804 A1 | 3/2007 | Paniconi et al. |
| 2007/0086526 A1 | 4/2007 | Koto et al. |
| 2007/0116124 A1 | 5/2007 | Wu et al. |
| 2007/0223585 A1 | 9/2007 | Fujisawa et al. |
| 2007/0239546 A1 | 10/2007 | Blum et al. |
| 2007/0268964 A1 | 11/2007 | Zhao |
| 2007/0297510 A1 | 12/2007 | Herpel et al. |
| 2008/0069230 A1 | 3/2008 | Kondo |
| 2008/0101707 A1 | 5/2008 | Mukherjee et al. |
| 2008/0159392 A1 | 7/2008 | Chiang et al. |
| 2008/0159398 A1 | 7/2008 | Murakami et al. |
| 2008/0159400 A1 | 7/2008 | Lee et al. |
| 2008/0175320 A1 | 7/2008 | Sun et al. |
| 2008/0181309 A1 | 7/2008 | Lee et al. |
| 2008/0214146 A1 | 9/2008 | Lincoln et al. |
| 2008/0240242 A1 | 10/2008 | Lainema |
| 2008/0253457 A1 | 10/2008 | Moore |
| 2008/0260278 A1 | 10/2008 | Zuo et al. |
| 2008/0281685 A1 | 11/2008 | Jaffe et al. |
| 2009/0060359 A1 | 3/2009 | Kim et al. |
| 2009/0067505 A1 | 3/2009 | Tourapis et al. |
| 2009/0304084 A1 | 3/2009 | Hallapuro |
| 2009/0161763 A1 | 6/2009 | Rossignol et al. |
| 2009/0172751 A1 | 7/2009 | Aldrey et al. |
| 2009/0207915 A1 | 8/2009 | Yan et al. |
| 2009/0238268 A1 | 9/2009 | Hsu et al. |
| 2010/0046614 A1 | 2/2010 | Choi et al. |
| 2010/0074332 A1 | 3/2010 | Karczewicz et al. |
| 2010/0109798 A1 | 5/2010 | Chu |
| 2010/0166072 A1 | 7/2010 | Bukin |
| 2010/0201457 A1 | 8/2010 | Lee et al. |
| 2010/0296580 A1 | 11/2010 | Metoevi et al. |
| 2011/0002387 A1 | 1/2011 | Chiu et al. |
| 2011/0002389 A1 | 1/2011 | Xu et al. |
| 2011/0090964 A1 | 4/2011 | Lidong et al. |
| 2011/0261882 A1 | 10/2011 | Zheng et al. |
| 2011/0286523 A1 | 11/2011 | Dencher |
| 2012/0093217 A1 | 4/2012 | Jeon et al. |

(56) References Cited

U.S. PATENT DOCUMENTS

| | | | |
|---|---|---|---|
| 2012/0294370 | A1 | 11/2012 | Chiu et al. |
| 2013/0064296 | A1 | 3/2013 | Sun et al. |
| 2013/0082810 | A1 | 4/2013 | Feng et al. |
| 2013/0287111 | A1 | 10/2013 | Xu et al. |
| 2013/0336402 | A1 | 12/2013 | Xu et al. |

FOREIGN PATENT DOCUMENTS

| | | |
|---|---|---|
| CN | 1977539 | 6/2007 |
| CN | 101001377 | 7/2007 |
| CN | 101005620 | 7/2007 |
| CN | 101018334 | 8/2007 |
| CN | 101023673 | 8/2007 |
| CN | 101023676 | 8/2007 |
| CN | 101378504 | 3/2009 |
| CN | 101621696 | 1/2010 |
| CN | 101647285 | 2/2010 |
| CN | 101945276 | 1/2011 |
| CN | 102045563 | 5/2011 |
| CN | 102340664 | 2/2012 |
| DE | 102010025816 | 1/2011 |
| DE | 102010046508 | 6/2011 |
| DE | 102011008630 | 9/2011 |
| EP | 0391094 | 12/1990 |
| EP | 0596732 | 11/1993 |
| EP | 0634871 | 7/1994 |
| EP | 0781041 | 6/1997 |
| EP | 0883298 | 6/1998 |
| EP | 0294957 | 12/1998 |
| EP | 1903798 | 3/2008 |
| EP | 1932366 | 6/2008 |
| EP | 1936995 | 6/2008 |
| EP | 1936998 | 6/2008 |
| EP | 1981281 | 10/2008 |
| GB | 2248361 | 4/1992 |
| GB | 2471577 | 1/2011 |
| GB | 2477033 | 4/2012 |
| JP | 10023420 | 1/1998 |
| JP | 10336666 | 12/1998 |
| JP | 11205799 | 7/1999 |
| JP | 4352189 | 3/2000 |
| JP | 2000350211 | 12/2000 |
| JP | 2003169338 | 6/2003 |
| JP | 2003319400 | 11/2003 |
| JP | 2004048512 | 2/2004 |
| JP | 2004328633 | 11/2004 |
| JP | 2004343349 | 12/2004 |
| JP | 2005094458 | 4/2005 |
| JP | 2005269164 | 9/2005 |
| JP | 2006033433 | 2/2006 |
| JP | 2009044350 | 2/2009 |
| JP | 2011029863 | 2/2011 |
| KR | 20090069461 | 7/2009 |
| KR | 1020110003438 | 1/2011 |
| TW | 494686 | 7/2007 |
| TW | I298597 | 7/2008 |
| TW | I301953 | 10/2008 |
| TW | I303944 | 12/2008 |
| TW | 201127068 | 8/2011 |
| TW | 201204054 | 1/2012 |
| TW | 200708115 | 6/2012 |
| WO | 9746020 | 12/1997 |
| WO | 9925122 | 5/1999 |
| WO | 9952281 | 10/1999 |
| WO | 2007035276 | 3/2007 |
| WO | 2008117158 | 10/2008 |
| WO | 2009110754 | 10/2009 |
| WO | 2010086041 | 8/2010 |
| WO | 2012045225 | 4/2012 |
| WO | 2006000504 | 6/2012 |
| WO | 2012083487 | 6/2012 |
| WO | 2012125178 | 9/2012 |
| WO | 2013048908 | 4/2013 |

OTHER PUBLICATIONS

Combined Search and Examination Report received for GB Patent Application No. GB1100658.2, dated May 16, 2011.
Combined Search and Examination Report received for GB1011216.7, dated Oct. 14, 2010, 6 pages.
Combined Search and Examination Report received for GB1015985.3, dated Jan. 17, 2011, 5 pages.
Decision of Grant for Japanese Patent Application No. 2013-540202 dated Feb. 24, 2015, 2 pages.
Decision of Rejection for Taiwan Patent Applicaiton No. 100101277 dated Jan. 22, 2014, 6 pages.
EP Office Action, dated Aug. 11, 2016, for European Patent Application No. 11830181.1.
European Office Action dated Mar. 16, 2016 for EP Patent Application No. 10860988.4.
Extended European Search Report for European Patent Application No. 11830181.1 dated Dec. 11, 2014, 9 pages.
Final Notification of Reasons for Refusal for Japanese Patent Application No. 2011-004871 dated Nov. 20, 2012, 4 pages.
Final Office Action for U.S. Appl. No. 12/567,540 dated Jan. 30, 2013, 12 pages.
Final Office Action for U.S. Appl. No. 12/567,540 dated Jun. 15, 2016, 14 pages.
Final Office Action for U.S. Appl. No. 12/566,823 dated Apr. 14, 2014, 13 pages.
Final Office Action for U.S. Appl. No. 12/566,823 dated Aug. 6, 2012, 18 pages.
Final Office Action for U.S. Appl. No. 12/657,168 dated Jan. 17, 2013, 16 pages.
Final Office Action for U.S. Appl. No. 13/575,233 dated Feb. 18, 2016, 14 pages.
Final Office Action for U.S. Appl. No. 13/575,233 dated May 14, 2015, 14 pages.
Final Office Action for U.S. Appl. No. 14/578,802 dated May 13, 2016, 5 pages.
Final Office Action for U.S. Appl. No. 10/848,992 dated Nov. 28, 2008, 12 pages.
Final Office Action for U.S. Appl. No. 12/767,744 dated Jan. 17, 2012, 6 pages.
Final Office Action dated Jun. 15, 2016 for U.S. Appl. No. 12/567,540.
Final Office Action, dated Jan. 4, 2017 for U.S. Appl. No. 13/575,233.
First Office Action and Search Report for Chinese Patent Applicaiton No. 201110056040.4 dated Sep. 2, 2013, 11 pages.
International Preliminary Report on Patentability and Written Opinion received for PCT Patent Application No. PCT/US2012/056682, dated Apr. 1, 2014.
International Preliminary Report on Patentability and Written Opinion received for PCT Patent Application No. PCT/CN2010/002107, dated Jun. 25, 2013.
International Preliminary Report on Patentability received for PCT Application No. PCT/CN2011/000568, dated Apr. 18, 2013.
International Search Report and Written Opinion received for PCT Patent Application No. PCT/CN2011/000568, dated Jan. 19, 2012.
International Search Report and Written Opinion received for PCT Patent Application No. PCT/CN2010/002107, dated Oct. 13, 2011.
Japanese Office Action received for Japanese Patent Application No. 2011-004871, dated Aug. 14, 2012.
Japanese Office Action received for Japanese Patent Application No. 2011-004871, dated Nov. 20, 2014, 4 pages of Office Action, including 2 pages of English Translation.
Korean Office Action received for Korean Patent Application No. 10-20110004254, dated Dec. 26, 2012; 5 pages of Office Action, including 2 pages of English Translation.
Non-Final Office Action for U.S. Appl. No. 12/566,823 dated Jan. 10, 2012, 10 pages.
Non-Final Office Action for U.S. Appl. No. 12/566,823 dated Sep. 18, 2013, 12 pages.
Non-Final Office Action for U.S. Appl. No. 12/567,540 dated Apr. 6, 2012, 11 pages.
Non-Final Office Action for U.S. Appl. No. 12/567,540 dated Oct. 21, 2013, 11 pages.

(56) References Cited

OTHER PUBLICATIONS

Non-Final Office Action for U.S. Appl. No. 12/567,540 dated Sep. 24, 2014, 10 pages.
Non-Final Office Action for U.S. Appl. No. 12/657,168 dated Mar. 16, 2012, 15 pages.
Non-Final Office Action for U.S. Appl. No. 13/575,233 dated Dec. 18, 2014, 10 pages.
Non-Final Office Action for U.S. Appl. No. 13/575,233 dated Jul. 14, 2016, 14 pages.
Non-Final Office Action for U.S. Appl. No. 13/575,233 dated Sep. 11, 2015, 11 pages.
Non-Final Office Action for U.S. Appl. No. 13/895,939 dated Dec. 4, 2015, 15 pages.
Non-Final Office Action for U.S. Appl. No. 13/895,939 dated Mar. 4, 2015, 10 pages.
Non-Final Office Action for U.S. Appl. No. 14/578,802 dated Dec. 23, 2015, 5 pages.
Non-Final Office Action for U.S. Appl. No. 13/575,233 dated Jun. 2, 2017.
Non-Final Office Action for U.S. Appl. No. 14/737,437, dated May 5, 2017.
Non-Final Office Action for U.S. Appl. No. 15/960,120, dated Jan. 2, 2019.
Non-Final Office Action for U.S. Appl. No. 16/552,995, dated Apr. 30, 2020.
Non-Final Office Action for U.S. Appl. No. 10/848,992 dated Dec. 12, 2007, 7 pages.
Non-Final Office Action for U.S. Appl. No. 12/767,744 dated Apr. 18, 2011, 7 pages.
Non-Final Office Action for U.S. Appl. No. 13/679,957 dated Feb. 21, 2014, 7 pages.
Non-Final Office Action dated Jul. 31, 2015 for U.S. Appl. No. 14/140,349.
Notice of Allowance for Taiwan Patent Applicaiton No. 099121807 dated Aug. 12, 2015, 3 pages.
Notice of Allowance for U.S. Appl. No. 12/566,823 dated Aug. 14, 2014, 8 pages.
Notice of Allowance for U.S. Appl. No. 12/582,061 dated Jan. 30, 2013, 16 pages.
Notice of Allowance for U.S. Appl. No. 13/895,939 dated Apr. 11, 2016, 7 pages.
Notice of Allowance for U.S. Appl. No. 13/895,939 dated Sep. 12, 2014, 10 pages.
Notice of Allowance for U.S. Appl. No. 14/140,349 dated Apr. 27, 2016, 5 pages.
Notice of Allowance for U.S. Appl. No. 14/578,802 dated Aug. 16, 2016, 8 pages.
Notice of Allowance for U.S. Appl. No. 12/567,540 dated Jan. 11, 2017.
Notice of Allowance for U.S. Appl. No. 13/996,582, dated Jul. 15, 2016.
Notice of Allowance for U.S. Appl. No. 14/737,437 dated Dec. 27, 2017.
Notice of Allowance for U.S. Appl. No. 15/960,120, dated May 1, 2019.
Notice of Allowance for U.S. Appl. No. 16/552,995, dated Aug. 21, 2020.
Notice of Allowance for U.S. Appl. No. 10/848,992 dated Dec. 11, 2009, 4 pages.
Notice of Allowance for U.S. Appl. No. 12/767,744 dated Oct. 16, 2012, 5 pages.
Notice of Allowance for U.S. Appl. No. 13/679,957 dated Jul. 10, 2014, 5 pages.
Notice of Allowance received for Chinese Patent Application No. 201010507057.2, dated Mar. 6, 2014.
Notice of allowance received for Japanese Patent Application No. 2010-211120, dated Jan. 24, 2012, 1 page.
Notice of Allowance received for Korean Patent Application No. 10-2010-0102216, dated Nov. 26, 2012, 3 pages of English Translation.
Notice of Allowance received for Korean Patent Application No. 10-2010-064539, dated Sep. 27, 2012, 3 pages of Notice of Allowance, including 1 page of English Translation.
Notice of Last Preliminary Rejection for Korean Patent Applicaiton No. 10-2010-4254 dated Jun. 19, 2013, 11 pages.
Notice of Preliminary Rejection for Korean Patent Applicaiton No. 10-2010-4254 dated Dec. 26, 2012, 5 pages.
Notice of Preliminary Rejection for Korean Patent Applicaiton No. 10-2010-4254 dated Jun. 12, 2012, 6 pages.
Office Action and Search Report for Taiwan Patent Applicaiton No. 099121807 dated Feb. 15, 2015, 8 pages.
Office Action and Search Report for Taiwan Patent Applicaiton No. 100101277 dated Aug. 7, 2013, 19 pages.
Office Action and Search Report for Taiwan Patent Application No. 100123109 dated Oct. 22, 2014, 18 pages.
Office Action for European Patent Application No. 10860988.4 dated Mar. 16, 2016, 9 pages.
Office Action for German Patent Applicaiton No. 10 2010 025 816.4 dated Jan. 30, 2015, 11 pages.
Office Action for German Patent Application No. 10 2011 008 630.7 dated Oct. 30, 2015, 18 pages.
Office Action for U.S. Appl. No. 15/960,120, dated Jan. 2, 2019.
Office Action received for China Patent Application No. 201010507057.2, dated Apr. 12, 2013, 12 pages, including 7 pages of English Translation.
Office Action Received for Chinese Patent Application No. 20100507057.2, dated Aug. 3, 2012, 3 pages of Office Action and 3 pages of English Translation.
Office Action received for Chinese Patent Application No. 201010270056.0, dated May 3, 2012.
Office Action received for Chinese Patent Application No. 2010-10270056.0, dated May 27, 2013.
Office Action received for Chinese Patent Application No. 201010507057.2, dated Aug. 3, 2012, 3 pages of Office Action and 3 pages of English Translation.
Office Action received for Chinese Patent Application No. 201010270056.0, dated Dec. 13, 2012, including 5 pages of English Translation.
Office Action received for Chinese Patent Application No. 201010507057.2, dated Oct. 28, 2013.
Office Action received for Chinese Patent Application No. 201110056040.4, dated Mar. 31, 2014.
Office Action received for Chinese Patent Application No. 201110056040.4, dated Sep. 2, 2013.
Office Action received for German Patent Application No. 10 2010 046 508.9, dated Jul. 26, 2011.
Office Action received for German Patent Application No. 10 2010 046 508.9, dated Sep. 5, 2012, 13 pages of Office Action, including 5 pages of English Translation.
Office Action received for Japanese Patent Application No. 2013532027, dated Jan. 21, 2014.
Office Action received for Japanese Patent Application No. 2013540202, dated Feb. 4, 2014.
Office Action received for Korean Patent Application No. 10-2010-4254, dated Feb. 10, 2012.
Office Action received for Korean Patent Application No. 1020137002525, dated Jan. 24, 2014.
Office Action received for Korean Patent Application No. 2010-0102216, dated May 22, 2012.
Office Action received for Korean Patent Application No. 10-2010-064539, dated Feb. 10, 2012.
Office Action received for Korean Patent Application No. 10-2011-4254, dated Jun. 19, 2013.
Office Action received for Taiwanese Patent Application No. 100101277, dated Feb. 14, 2014.
Office Action received for Taiwanese Patent Application No. 100101277, dated Aug. 7, 2013.
Office Action received in U.S. Appl. No. 12/566,823, dated Jan. 10, 2012, 10 pages.
Reasons for Rejection for Japanese Patent Application No. 2011-004871 dated Aug. 14, 2012, 4 pages.
Search Report dated Jul. 26, 2016, for TW Patent Application No. 104130109.

(56) References Cited

OTHER PUBLICATIONS

Second Office Action for Chinese Patent Applicaiton No. 201110056040.4 dated Mar. 31, 2014, 7 pages.
"Content description data", Telecommunication Standardization Sector of ITU, Erratum 1, Recommendation ITU-T H.262 Amendment 1, Geneva, Apr. 22, 2002. 1 page.
"Infrastructure of audiovisual services—Coding of moving video", International Telecommunication Union, Series H: Audiovisual and Multimedia Systems, H.262, Feb. 2000, 220 pages.
"MVC Decoder Description", ITU—Telecommunication Standardization Sector, Study Group 16, Study Period 1997-2000, Geneva Feb. 7-18, 2000.
"No English Translation Available", Second Office Action for Chinese Patent Application No. 201080068069.8 dated Oct. 20, 2015, 5 pages.
"No English Translation Available", Third Office Action for Chinese Patent Application No. 201080068069.8 dated Apr. 1, 2016, 3 pages.
"Series H: Audiovisual and Multimedia Systems Infrastructure of audiovisual services—Coding of moving video", International Telecommunication Union, H.262, Amendment 2, Jan. 2007, Information technology—Generic coding of moving pictures and associated audio information: Video Amendment 2: Support for colour spaces, 14 pages.
"Series H: Audiovisual and Multimedia Systems Infrastructure of audiovisual services—Coding of moving video", International Telecommunication Union, H.262, Corrigendum 2, Information technology—Generic coding of moving pictures and associated audio information: Video Technical Corrigendum 2, May 2006, 14 pages.
"Series H: Audiovisual and Multimedia Systems Infrastructure of audiovisual services—Coding of moving video", International Telecommunication Union, H.262, Amendment 1, Nov. 2000, 26 pages.
"Series H: Audiovisual and Multimedia Systems Infrastructure of audiovisual services—Coding of moving video", International Telecommunication Union, H.262, Amendment 4, Feb. 2012, Information technology—Generic coding of moving pictures and associated audio information: Video: Frame packing arrangement signalling for 3D content, 238 pages.
"Series H: Audiovisual and Multimedia Systems Infrastructure of audiovisual services—Coding of moving video", International Telecommunication Union, H.262, Corrigendum 1, Nov. 2000, 10 pages.
"Series H: Audiovisual and Multimedia Systems Infrastructure of audiovisual services—Coding of moving video", International Telecommunication Union, H.264, Jan. 2012, Recommendation ITU-T H.264, 680 pages.
"Series H: Audiovisual and Multimedia Systems Infrastructure of audiovisual services—Coding of moving video", International Telecommunication Union, H.264, Nov. 2007, Advanced video coding for generic audiovisual services, 564 pages.
"Series H: Audiovisual and Multimedia Systems Infrastructure of audiovisual services—Coding of moving video", International Telecommunication Union; H.264, Feb. 2014, Advanced video coding for generic audiovisual services, 790 pages.
"Working Draft No. 2, Revision 0 (WD-2)", Document JVT-B118, Dec. 3, 2011, pp. 3-100; p. 27, paragraph 4.4.4 to p. 32, paragraph 4.4.5.
Anttila, et al., "Transferring Real-Time Video on the Internet", www.tml.hut.fi/Opinnot/Tik-110.551/1997/iwsem.html, printed Aug. 4, 2000.
Baxes, "Digital Image Processing: Principles and Applications", John Wiley & Sons, 1994, 88-91.
Bjontegaard, "H.26L Test Model Long Term 8 (TML-8) draft0", ITU Study Group 16, Apr. 2, 2001, 1-2, 16-19.
Bjontegaard, "Video Coding Experts Group (Question 15)", ITU—Telecommunications Standardization Section, Document Q15-F-11, Sixth Meeting: Seoul, Korea, Nov. 3-6, 1998.
Bjontegaard, "Video Coding Experts Group (Question 15)", ITU—Telecommunications Standardization Section, Document Q15-J-72, Tenth Meeting: Osaka, May 16-18, 2000.

Blume, "New Algorithm for Nonlinear Vector-Based Upconversion with Center Weighted Medians", Journal of Electronic Imaging 6(3), Jul. 1997, 368-378.
Blume, "Nonlinear Vector Error Tolerant Interploation of Intermediate Video Images by Weighted Medians", Signal Processing Image Communication, vol. 14, (Search Report PCTUS00/18386), 851-868.
Chang, et al., "11 Fast integer motion estimation for H.264 video coding standard", 11, 2004 IEEE International Conference on Multimedia and Expo : Jun. 27-30, 2004, Taipei, Taiwan, IEEE Operations Center, Piscataway, NJ, vol. 1, Jun. 27, 2004.
Chang, A. et al., "Fast integer motion estimation for H.264 video coding standard", 2004 IEEE International Conference on Multimedia and Expo: Jun. 27-30, 2004, vol. 1, pp. 289-292, Taipei, Taiwan, IEEE Operations Center, Piscataway, NJ.
Chen, et al., "A Macroblock Level Adaptive Search Range Algorithm for Variable Block Size Motion Estimation in h.264/avc", International Symposium on Intelligent Signal Processing and Communication Systems, ISPACS, Xiamen, China, Nov. 28, 2007-Dec. 1, 2007, 598-601.
Chen, et al., "Source Model for Transform Video Coder and its Application—Part II: Variable Frame Rate Coding", XP000687649, IEEE Transactions on Circuits and Systems for Video Technology, vol. 7, No. 2, Apr. 1997.
Chiu, et al., "Fast Techniques to Improve Self Derivation of Motion Estimation", Joint Collaborative Team on Video Coding (JCT-VC) of ITU-T SG16 WP3 and ISO/IEC JTC1/SC29/WG11, JCTVC-B047, Jul. 21-28, 2010 (10 pages).
Chiu, et al., "Report of Self Derivation of Motion Estimation Improvement in TMuC", Joint Collaborative Team on Video Coding (JCT-VC) of ITU-T SG16 WP3 and ISO/IEC JTC1/SC29/WG11, URL: http://phenix,int-evry.fr/jct/doc_end_user/documents/3_Guangzhou/wg11/JCTVC-C127-M18151-v1-JCTVC-C127.zip (see JCTVC-C127.doc), Oct. 3, 2010 (13 pages).
Chiu, et al., "Self-Derivation of Motion Estimation Techniques to Improve Video Coding Efficientcy", Applications of Digital Image Processing XXXIII Proc. of SPIE, vol. 7798, Sep. 7, 2010 (11 pages).
Chiu, et al., "TE1: Report of Self Derivation of Motion Estimation Improvement in TMuC", 3. JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-TSG.16); http://wftp3.itu.int/av-arch/jctvc-site. No. JCTVC-C127, Mar. 10, 2010 XP030007834.
Chiu, et al., "TE1: Fast Techniques to Improve Self Derivation of Motion Estimation", 2. JCT-VC Meeting; Jul. 21, 2010 to Jul. 28, 2010; Geneva Joint Collaborative Team on Video Coding of ISO/IEC JTC1/SC29/WG11 and ITU-T SG.1; URL: http//wftp3.itu.int/av-arch/jctvc-site/; No. JCTVC-B047; Jul. 28, 2010, XP030007627; ISSN: 0000-0048.
Haavisto, et al., "Motion Adaptive Scan Rate Up-Conversion", Multidimensional Systems and Signal Processing, XP 000573419, vol. 3, 1992 (Search Report PCTUS/183836 and PCTUS00/18390), 113-130.
Han, et al., "Frame-Rate Up-Conversion Using Transmitted Motion and Segmentation Fields for Very Low Bit-Rate Video Coding", Proceedings for ICIP (International Conference on Image Processing), 1997, 747-750.
Hsia, et al., "High Efficiency and Low Complexity Motion Estimation Algorithm for MPEG-4 AVC/H.264 Coding", Tamkang Journal of Science and Engineering, 2007,vol. 10, No. 3, 221-234.
Huang, et al., "TE1: decoder-Side Motion Vector Derivation with Switchable Template Matching", Joint Collaborative Team on Video Coding (JCT-VC) of ITU-T SG16 WP3 and ISO/ IEC JTC1/SC29/WG11, Document: JCTVC-B076, Jul. 21-28, 2010, 11 pages.
Kamp, et al., "Decoder Side Motion Vector Derivation for Inter Frame Video Coding", 15th IEEE International Conference on Image Processing (ICIP 2008). Oct. 12-15, 2008, pp. 1120-1123.
Kamp, et al., "Fast Decoder Side Motion Vector Derivation for Inter Frame Video Coding", Proceedings of the International Picture Coding Symposium (PCS) '09, Digital Object Identifier 10.1109/PCS.2009.5167453, Print ISBN 978-1-4244-4593-6, IEEE, Piscataway, Chicago, IL, USA, May 6-8, 2009, 4 pages.

(56) References Cited

OTHER PUBLICATIONS

Kamp, Steffen et al., "Fast decoder side motion vector derivation for inter frame video coding", Picture Coding Symposium 2009, May 6, 2009, Chicago, IL.

Kim, et al., "Local Motion-Adaptive Interpolation Technique Based on Block Matching Algorithms", Signal Processing Image Communication, Nov. 1992, No. 6 Amsterdam.

Kiranyaz, et al., "Motion Compensated Frame Interpolation Techniques for VLBR Video Coding", Proceedings for ICIP (International Conference on Image Processing), 1997.

Klomp, et al., "Decoder-Side Block Motion Estimation for H.264/ MPEG-4 AVC Based Video Coding", IEEE International Symposium on Circuits and Systems (ISCAS 2009), May 24-27, 2009, pp. 1641-1644.

Kokaram, et al., "Detection and Removal of Impulsive Noise in Image Sequences", Proceedings of the Singapore International Conference on Image Processing, Sep. 1992, Singapore.

Kronander, "Post and Pre-Processing in Coding of Image Sequences Using Filters with Motion Compensated History", International Conference on Acoustics, Speech, and Signal Processing, Apr. 1988, New York City.

Laroche, et al., "RD Optimized Coding for Motion Vector Predictor Selection", IEEE Transactions on Circuits and Systems for Video Technology, vol. 18(12), Dec. 2008, pp. 1681-1691.

Migliorati, et al., "Multistage Motion Estimation for Image Interpolation", Signal Processing Image Communication, vol. 7, 1995, 187-199.

Murakami, et al., "Advanced B Skip Mode with Decoder-Side Motion Estimation", 37th VCEG meeting at Yokohama, VCEG-AK12, Hitachi Inspire the Next, Central research Laboratory, Embedded System Platform Research Laboratory.

Murakami, T. et al., "Advanced B Skip Mode with Decoder-side Motion Estimation", 37 VCEG Meeting (Video Coding Experts Group of ITU-T SG.16), Apr. 11, 2009, Yokohama, Japan.

Nisar, et al., "Fast Motion Estimation Algorithm Based on Spatio-Temporal Correlation and Direction of Motion Vectors", Electronics Letters, Dept. of Mechatronics, Gwangju Inst. of Sci & Technol. 11/23/20016, vol. 42, No. 24, 2.

Poynton, "A Technical Introduction to Digital Video", John Wiley & Sons, 1996, 8-11.

Sadka, et al., "Error Performance Improvement in Block-Transform Video Coders", www.research.att.com/mrc/pv99/contents/papers/sadka/sadka.htm printed Aug. 4, 2000.

Sallent, "Simulation of a Teleconference Codec for ISDN", Proceedings of the European Signal Proceeding Conference, vol. 4, Amsterdam, Sep. 1990.

Sato, et al., "Video OCR for Digital News Archive", IEEE International Workshop on content-Based Access of Image and Video Database, XP002149702, 1998, 52-60.

Stallings, et al., "Business Data Communications", Third Edition, 198, Prentice-Hall, Inc., Chapter 2.

Sullivan, et al., "Meeting report of the second meeting of the Joint Collaborative Team on Video Coding (JCT-VC), Geneva, CH, Jul. 21-28, 2010", URL: http://wftp3.itu.int/av-arch/jctvc-site/, Oct. 7, 2010.

Thomas, "A Comparison of Motion-Compensated Interlace-to-Progressive Conversion Methods", Signal Processing Image Communication, vol. 12, 1998, 209-229.

Ugur (Nokia), K. et al., "11 Description of video coding technology", proposal by Tandberg, Nokia, Ericsson, 1. JCT-VC Meeting; Apr. 15, 2010-Apr. 23, 2010; Dresden; URL: http://wftp3.itu.int/av-arch/jctvc-site/, Apr. 12, 2010.

Werda, et al., "Optimal DSP-Based Motion Estimation Tools Implementation for H.264/AVC Baseline Encoder", IJCSNS International Journal of Computer Science and Network Security, May 2007, vol. 7, No. 5, 141-150.

Wiseman, "An Introduction to MPEG Video Compression", members. aol.com/symbandgrl printed Apr. 14, 2000.

Yi, et al., "Fast techniques to improve seif derivation of motion estimation—presentation slides", Jul. 28, 2010 (Jul. 28, 2010), XP055255145, Retrieved from the Internet: URL:http://wftp3.itu.int/av-arch/jctvc-site/2010_07_B_Geneva/JCTVC-B047.zip.

* cited by examiner

METHODS AND SYSTEMS FOR MOTION VECTOR DERIVATION AT A VIDEO DECODER

CLAIM FOR PRIORITY

This application is a continuation of U.S. patent application Ser. No. 16/552,995, filed on 27 Aug. 2019, now U.S. Pat. No. 10,863,194, entitled "METHODS AND SYSTEMS FOR MOTION VECTOR DERIVATION", which is a continuation of U.S. patent application Ser. No. 15/960,120, filed on 23 Apr. 2018, now U.S. Pat. No. 10,404,994, entitled "METHODS AND SYSTEMS FOR MOTION VECTOR DERIVATION", which is a continuation of U.S. patent application Ser. No. 14/737,437, filed on 11 Jun. 2015, now U.S. Pat. No. 9,955,179, entitled "METHODS AND SYSTEMS FOR MOTION VECTOR DERIVATION AT A VIDEO DECODER", which is a continuation of U.S. patent application Ser. No. 12/567,540, filed on 25 Sep. 2009, now U.S. Pat. No. 9,654,792, entitled "METHODS AND SYSTEMS FOR MOTION VECTOR DERIVATION AT A VIDEO DECODER", which is a Non-Provisional application of U.S. Provisional Patent Application Ser. No. 61/222,984, filed on 3 Jul. 2009, entitled "METHODS AND SYSTEMS FOR MOTION VECTOR DERIVATION AT A VIDEO DECODER", all of which are incorporated by reference in their entireties for all purposes.

BACKGROUND

Motion estimation (ME) in video coding may be used to improve video compression performance by removing or reducing temporal redundancy among video frames. For encoding an input block, traditional motion estimation may be performed at an encoder within a specified search window in reference frames. This may allow determination of a motion vector that meets a predefined requirement, such as the minimization of a metric such as the sum of absolute differences (SAD) between the input block and the reference block. The motion vector (MV) information can then be transmitted to a decoder for motion compensation. The video decoder may then utilize the received motion vector information to displace the pixels from the reference frames to form reconstructed output pixels. This displacement may be used to represent the motion compensation.

Note that in the description below, the terms "frame" and "picture" are used interchangeably, as would be understood by persons of ordinary skill in the art.

BRIEF DESCRIPTION OF THE DRAWINGS/FIGURES

DETAILED DESCRIPTION

The following applies to video compression. The system and method described below may allow derivation of a motion vector (MV) at a video decoder. This can reduce the amount of information that needs to be sent from a video encoder to the video decoder. A block-based motion vector may be produced at the video decoder by performing motion estimation on available previously decoded pixels with respect to blocks in one or more reference frames. The available pixels could be, for example, spatially neighboring blocks in the sequential scan coding order of the current frame, blocks in a previously decoded frame, or blocks in a downsampled frame in a lower pyramid when layered coding has been used. In an alternative embodiment, the available pixels can be a combination of the above-mentioned blocks.

Already Decoded Spatially Neighboring Blocks in the Current Frame

Figure 1:
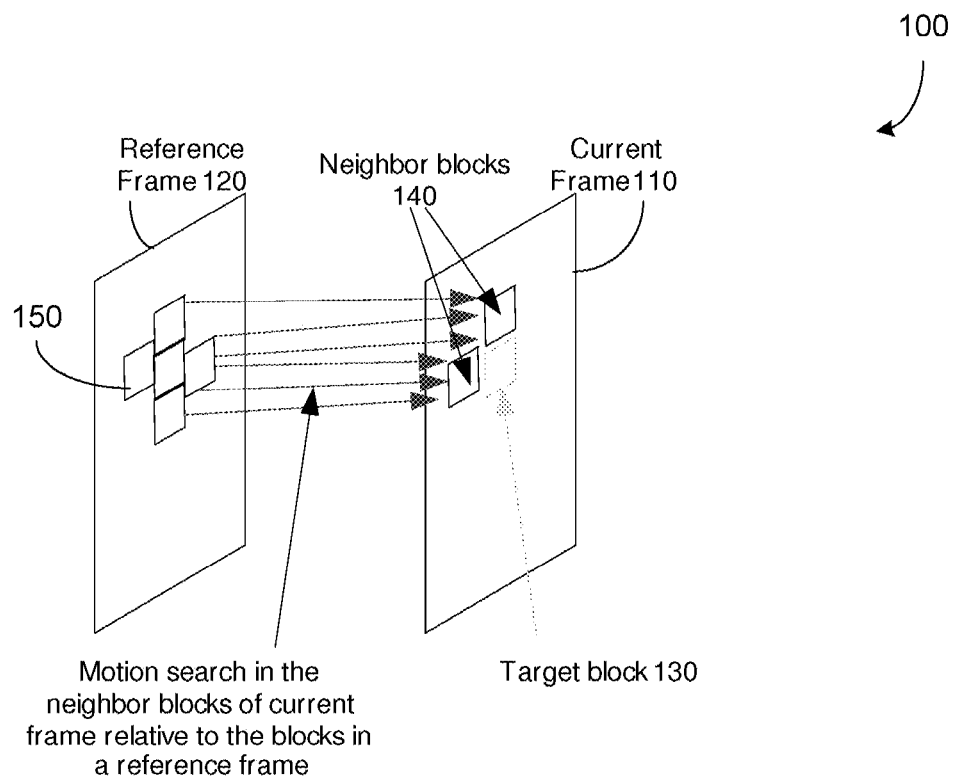
FIG. 1 illustrates MV derivation using already decoded blocks from a current frame, according to an embodiment.

In an embodiment, pixels that can be used to determine an MV may come from spatially neighboring blocks in the current frame, where these blocks have been decoded prior to the decoding of the target block in the current frame. FIG. 1 shows an example 100 utilizing one or more blocks 140 that are above and to the left of the target block 130 in a current frame 110. To determine a motion vector for the target block 130 that needs to be decoded in the current frame 110, motion search may be performed for one or more of the blocks 140 above and to the left of the target block 130, relative to the blocks 150 of reference frame 120, where blocks 150 correspond to blocks 140. Such an approach may be useful in decoding of predictive frames, also called P-frames, which hold only the changes relative to a previous frame.

In an embodiment, the raster scan coding order may be used to identify the spatial neighbor blocks that are above, to the left, above and to the left, and above and to the right of the target block.

Generally, this approach may be applied to available pixels of spatially neighboring blocks in the current frame, as long as the neighboring blocks were decoded prior to the target block in sequential scan coding order. Moreover, this approach may apply motion search with respect to reference frames in the reference frame list for a current frame.

Figure 2:
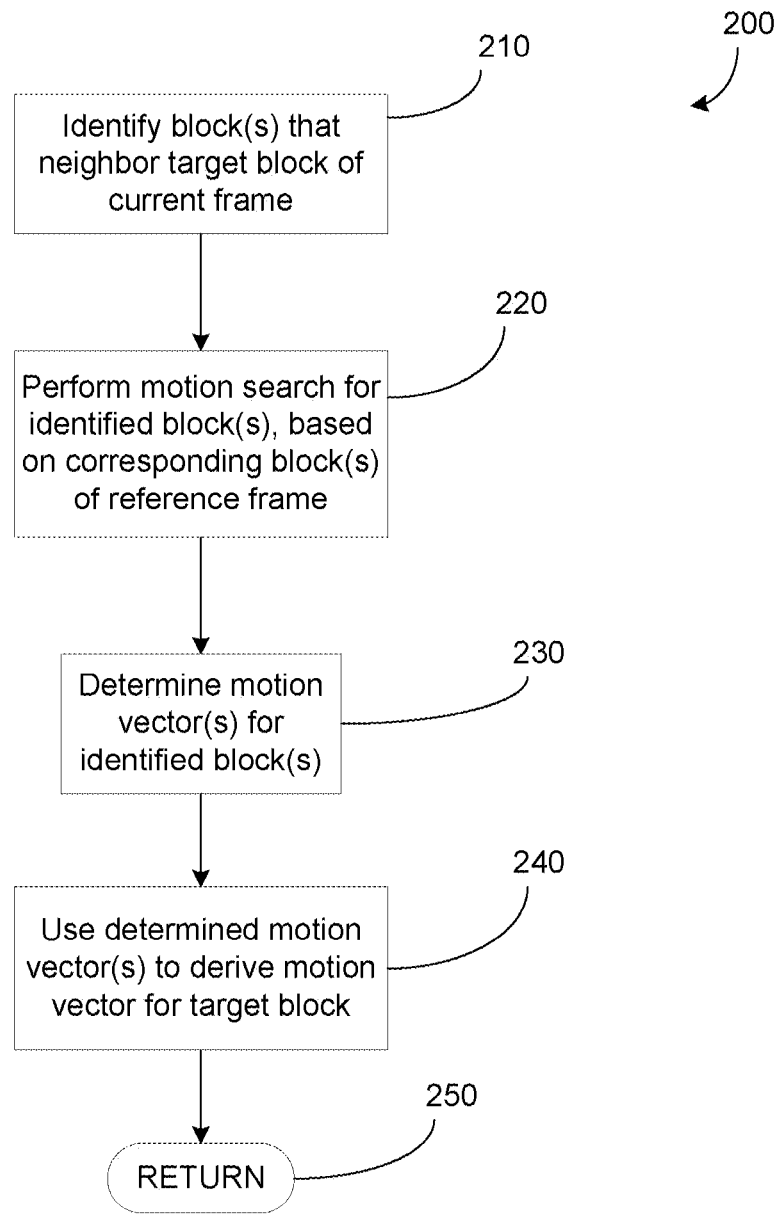
FIG. 2 is a flow chart illustrating the process of MV derivation using already decoded blocks from a current frame, according to an embodiment.

The processing for this embodiment is illustrated as process 200 in FIG. 2. At 210, one or more blocks of pixels may be identified, where these blocks neighbor the target block of the current frame. Such neighboring blocks may or may not be immediately adjacent to the target block. At 220, motion search may be performed for the identified blocks. The motion search may be based on corresponding blocks of a reference frame, and at 230 yields motion vectors that connects the corresponding blocks of the reference frame to the identified blocks. Note that in an embodiment, 220 and 230 may precede 210, such that the motion vectors for the identified blocks may be known and the identified blocks decoded, prior to the identified blocks being used in this process. At 240, the motion vectors of the identified blocks are used to derive the motion vector for the target block, which may then be used for motion compensation for the target block. This derivation may be performed using any suitable process known to persons of ordinary skill in the art. Such a process may be, for example and without limitation, weighted averaging or median filtering. The process 200 concludes at 250.

Figure 3:
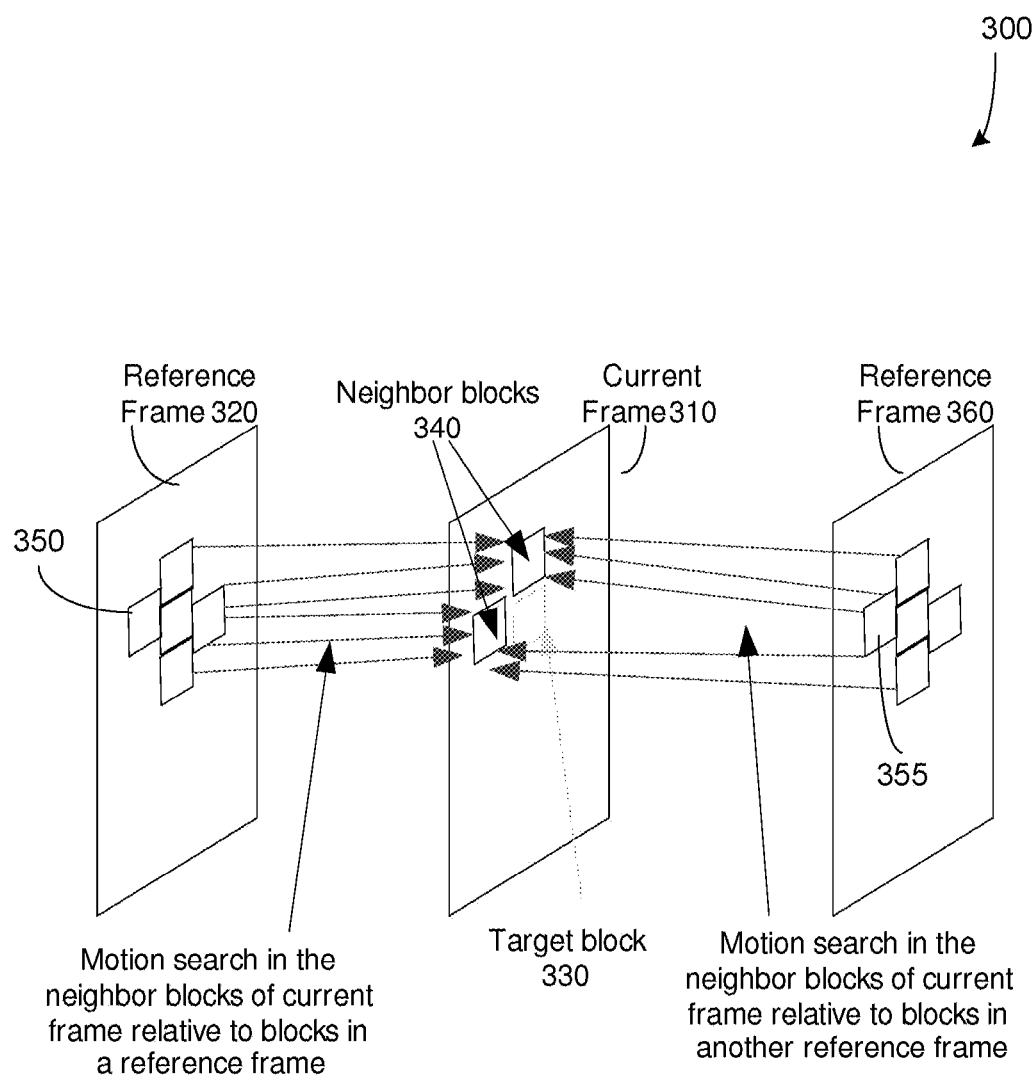
FIG. 3 illustrates MV derivation using already decoded blocks from a current frame, where the motion search is based on blocks in two different reference frames, according to an embodiment.

FIG. 3 shows an embodiment 300 that may utilize one or more neighboring blocks 340 (shown here as blocks above and to the left of the target block 330) in a current frame 310. This may allow generation of a motion vector based on one or more corresponding blocks 350 and 355 in a previous reference frame 320 and a subsequent reference frame 360, respectively, where the terms "previous" and "subsequent" refer to temporal order. The motion vector can then be applied to target block 330. Here, the motion search may operate over an additional reference frame, in contrast to the embodiments of FIGS. 1 and 2. In an embodiment, a raster scan coding order may be used to determine spatial neighbor blocks above, to the left, above and to the left, and above and to the right of the target block. This approach may be used for bi-directional (B) frames, which use both the preceding and following frames for decoding.

The approach exemplified by FIG. 3 may be applied to available pixels of spatially neighboring blocks in a current frame, as long as the neighboring blocks were decoded prior to the target block in sequential scan coding order. Moreover, this approach may apply motion search with respect to reference frames in reference frame lists for a current frame.

Figure 4:
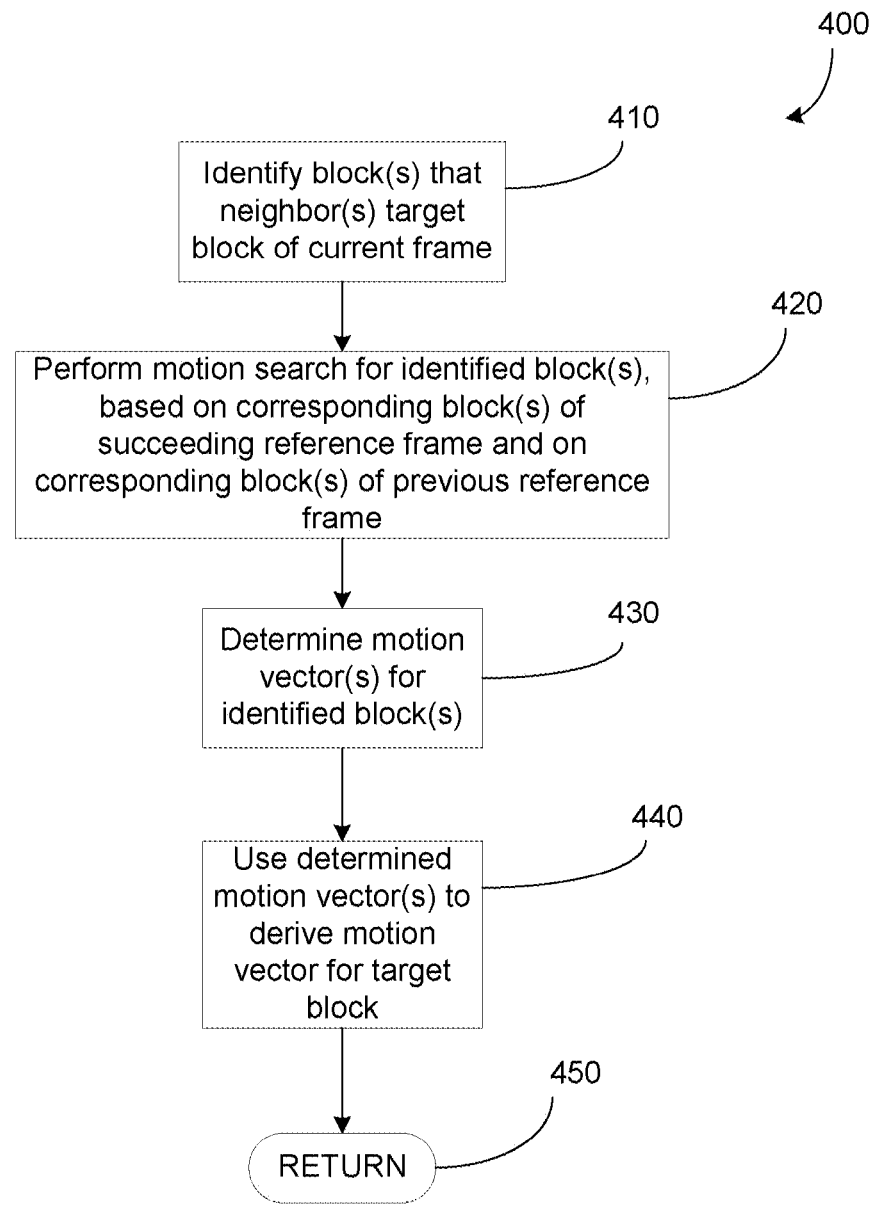
FIG. 4 is a flow chart illustrating MV derivation using already decoded blocks from a current frame, where the motion search is based on blocks in two different reference frames, according to an embodiment.

The process of the embodiment of FIG. 3 is shown as process 400 of FIG. 4. At 410, one or more blocks of pixels may be identified in the current frame, where the identified blocks neighbor the target block of the current frame. At 420, motion search for the identified blocks may be performed, based on corresponding blocks in a temporally subsequent reference frame and on corresponding blocks in a previous reference frame. At 430, the motion search may result in motion vectors for the identified blocks. As in the case of FIGS. 2, 420 and 430 may precede 410, such that the motion vectors of the neighboring blocks may be determined prior to identification of those blocks. At 440, the motion vectors may be used to derive the motion vector for the target block, which may then be used for motion compensation for the target block. This derivation may be performed using any suitable process known to persons of ordinary skill in the art. Such a process may be, for example and without limitation, weighted averaging or median filtering. The process concludes at 450.

Already Decoded Blocks in Previously Decoded Frames

Figure 5:
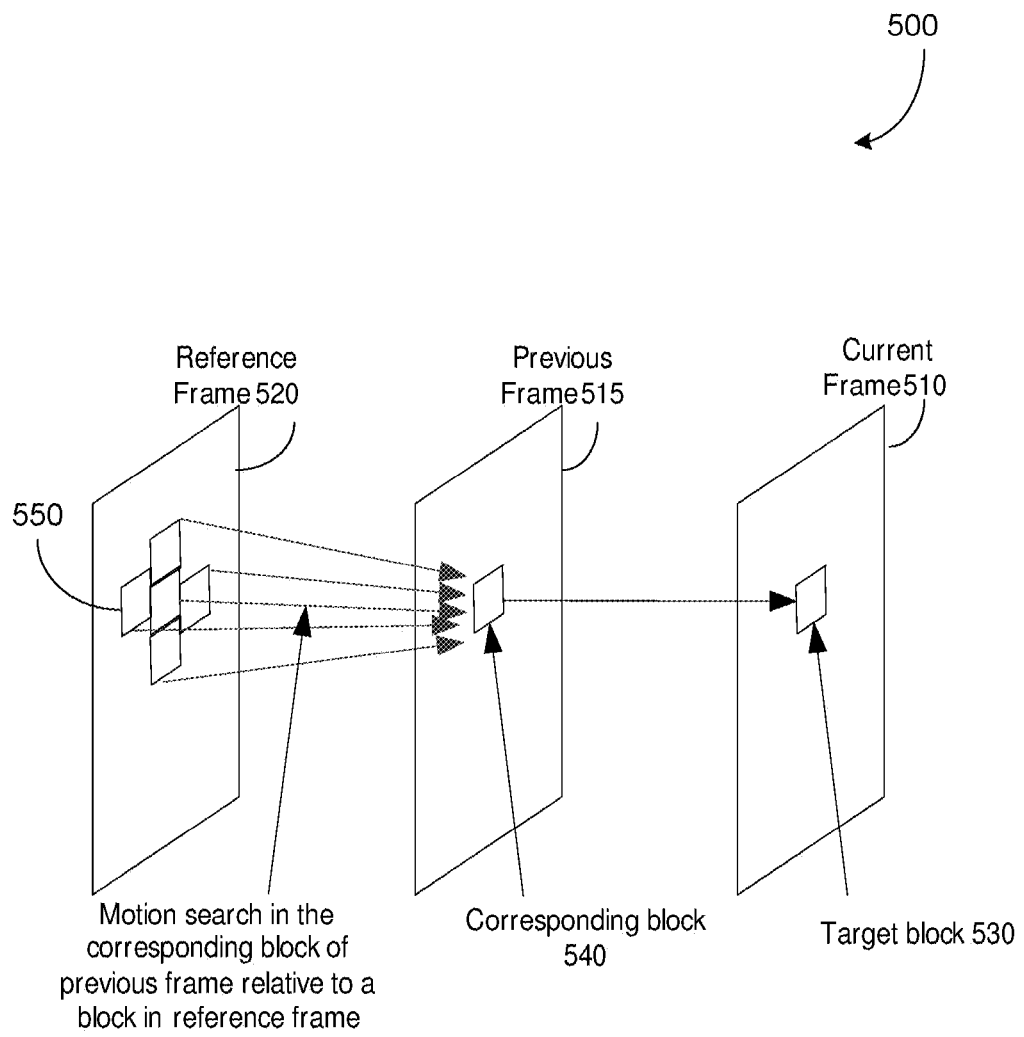
FIG. 5 illustrates MV derivation using previously decoded blocks from a previously decoded frame, according to an embodiment.

In this embodiment, pixels that can be used to determine an MV may come from a corresponding block in a previously reconstructed frame. FIG. 5 shows an example 500 of utilizing a block 540 from a previous frame 515, where the block 540 may be in a position corresponding to a target block 530 in a current frame 510. Here the MV can be derived from the relationship between the corresponding block 540 of the previously decoded frame 515 relative to one or more blocks 550 in a reference frame 520.

Figure 6:
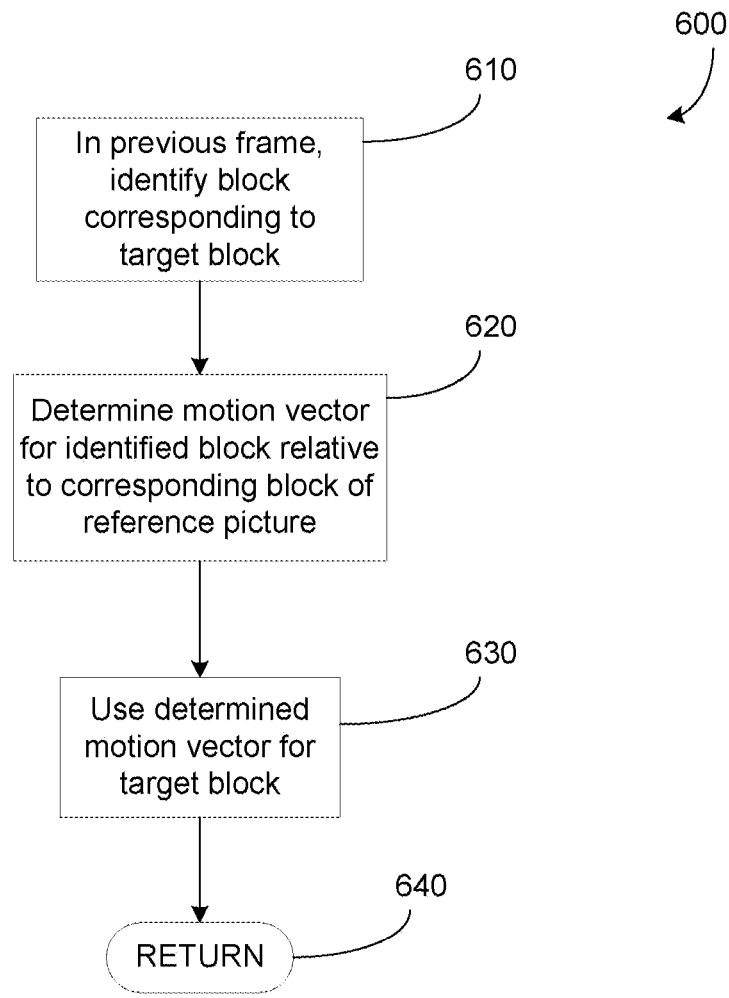
FIG. 6 is a flow chart illustrating MV derivation using previously decoded blocks from a previously decoded frame, according to an embodiment.

The processing for such an embodiment is shown in FIG. 6 as process 600. At 610, a block of pixels may be identified in a previous frame, where the identified block corresponds to a target block of a current frame. At 620, a motion vector may be determined for the identified block relative to a corresponding block in a reference frame. In an alternative embodiment, 620 may precede 610, such that the motion vector for the block of the previous frame may be derived prior to identifying the block for use with respect to the target block of the current frame. At 630, the motion vector may be used for the target block. The process may conclude at 640.

Another embodiment may use neighboring blocks next to the corresponding block of the previous frame to do the motion search in a reference frame. Examples of such neighboring blocks could be the blocks above, below, to the left, or to the right of the corresponding block in the previously reconstructed frame.

Figure 7:
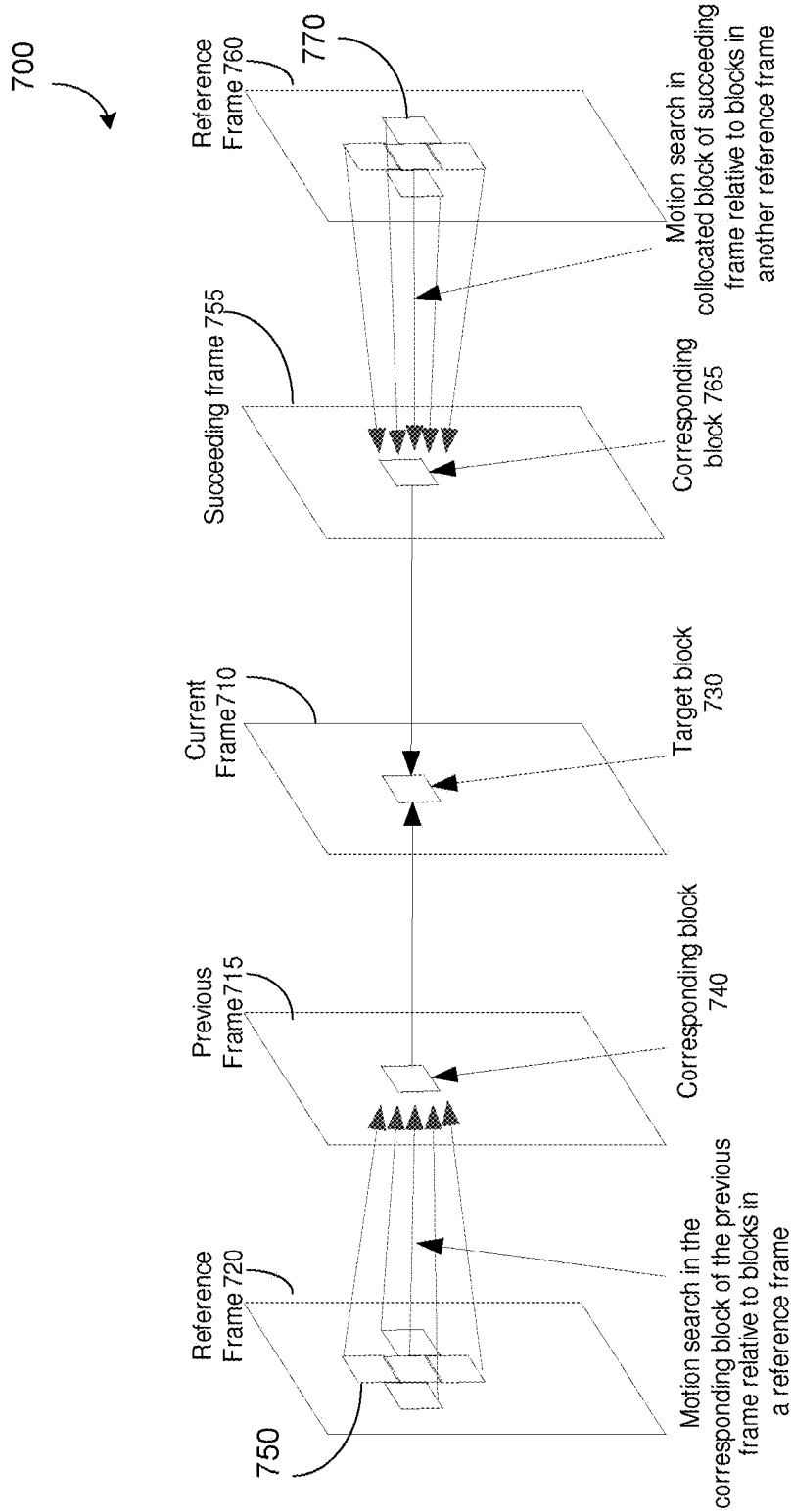
FIG. 7 illustrates MV derivation using previously decoded blocks from already decoded previous and succeeding frames, according to an embodiment.
Figure 8:
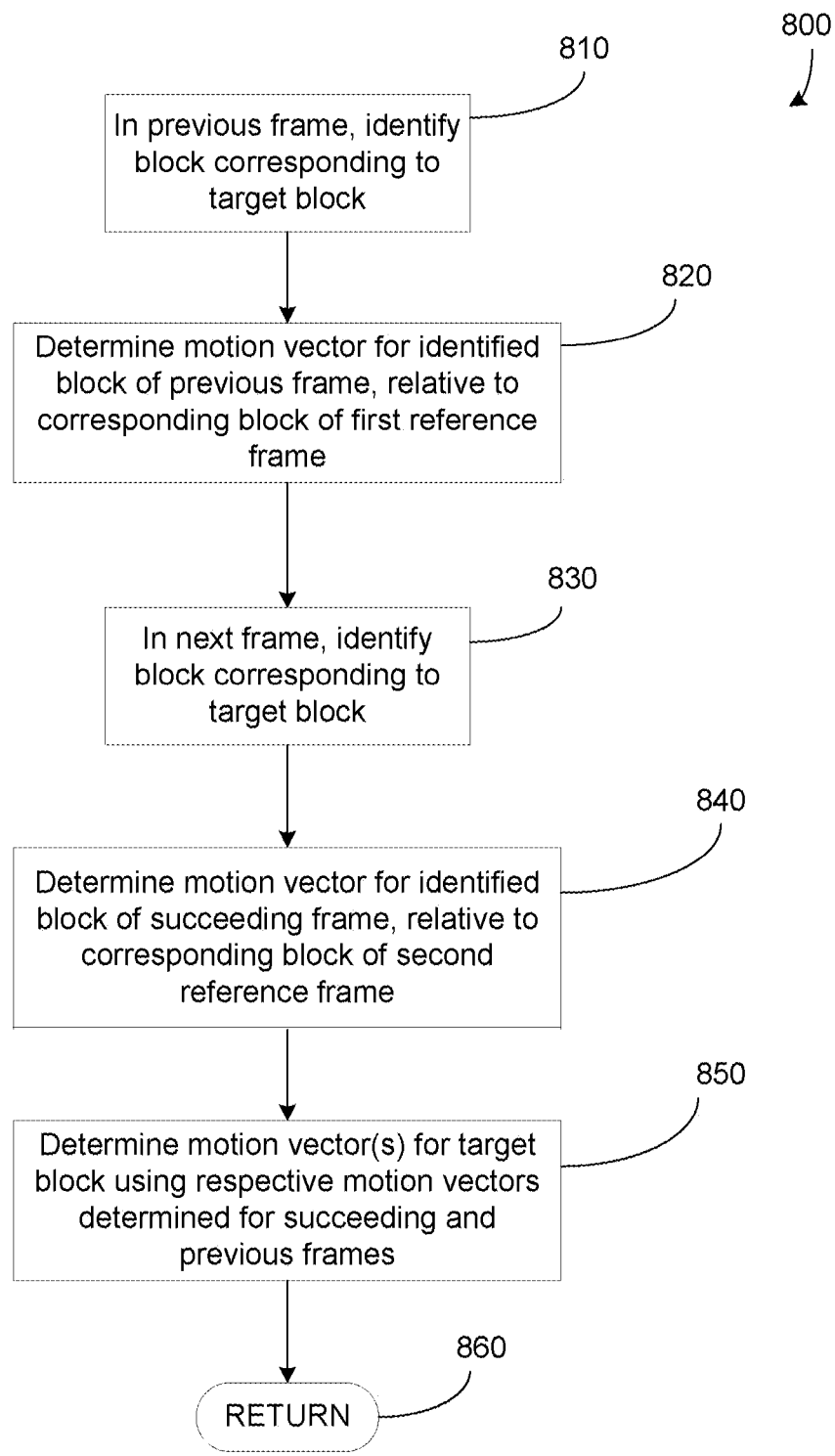
FIG. 8 is a flow chart illustrating MV derivation using previously decoded blocks from already decoded previous and succeeding frames, according to an embodiment.

In an alternative embodiment, the available pixels can come from the corresponding blocks of previous and succeeding reconstructed frames in temporal order. This approach is illustrated in FIG. 7 as embodiment 700. To encode a target block 730 in a current frame 710, already decoded pixels may be used, where these pixels may be found in a corresponding block 740 of a previous frame 715, and in a corresponding block 765 of a succeeding frame 755. A first motion vector may be derived for corresponding block 740, by doing a motion search through one or more blocks 750 of reference frame 720. Block(s) 750 may neighbor a block in reference frame 720 that corresponds to block 740 of previous frame 715. A second motion vector may be derived for corresponding block 765 of succeeding frame 755, by doing a motion search through one or more blocks 770 of reference frame 760. Block(s) 770 may neighbor a block in reference frame 760 that corresponds to block 765 of succeeding frame 755. Based on the first and second motion vectors, forward and/or backward motion vectors for target block 730 may be determined. These latter motion vectors may then be used for motion compensation for the target block This process is described as process 800 of FIG. 8. At 810, a block may be identified in a previous frame, where this identified block may correspond to the target block of the current frame. At 820, a first motion vector may be determined for this identified block of the previous frame, where the first motion vector may be defined relative to a corresponding block of a first reference frame. In 830, a block may be identified in a succeeding frame, where this block may correspond to the target block of the current frame. A second motion vector may be determined at 840 for this identified block of the succeeding frame, where the second motion vector may be defined relative to the corresponding block of a second reference frame. At 850, one or two motion vectors may be determined for the target block using the respective first and second motion vectors above. Process 800 may conclude at 860.

In another embodiment, neighboring blocks next to the corresponding block in the previous and succeeding reconstructed frames may be used to do the motion search based on their respective reference frames. An example of the neighboring blocks may be the blocks above, below, to the left, or to the right of the collocated blocks in the reconstructed frames, for example. Moreover, this approach can use motion search using reference frames in the reference frame lists, in both forward and backward temporal order.

Generally, the approach of FIGS. 3 and 7 may be used in the codec processing of bi-directional (B) frames.

Figure 9:
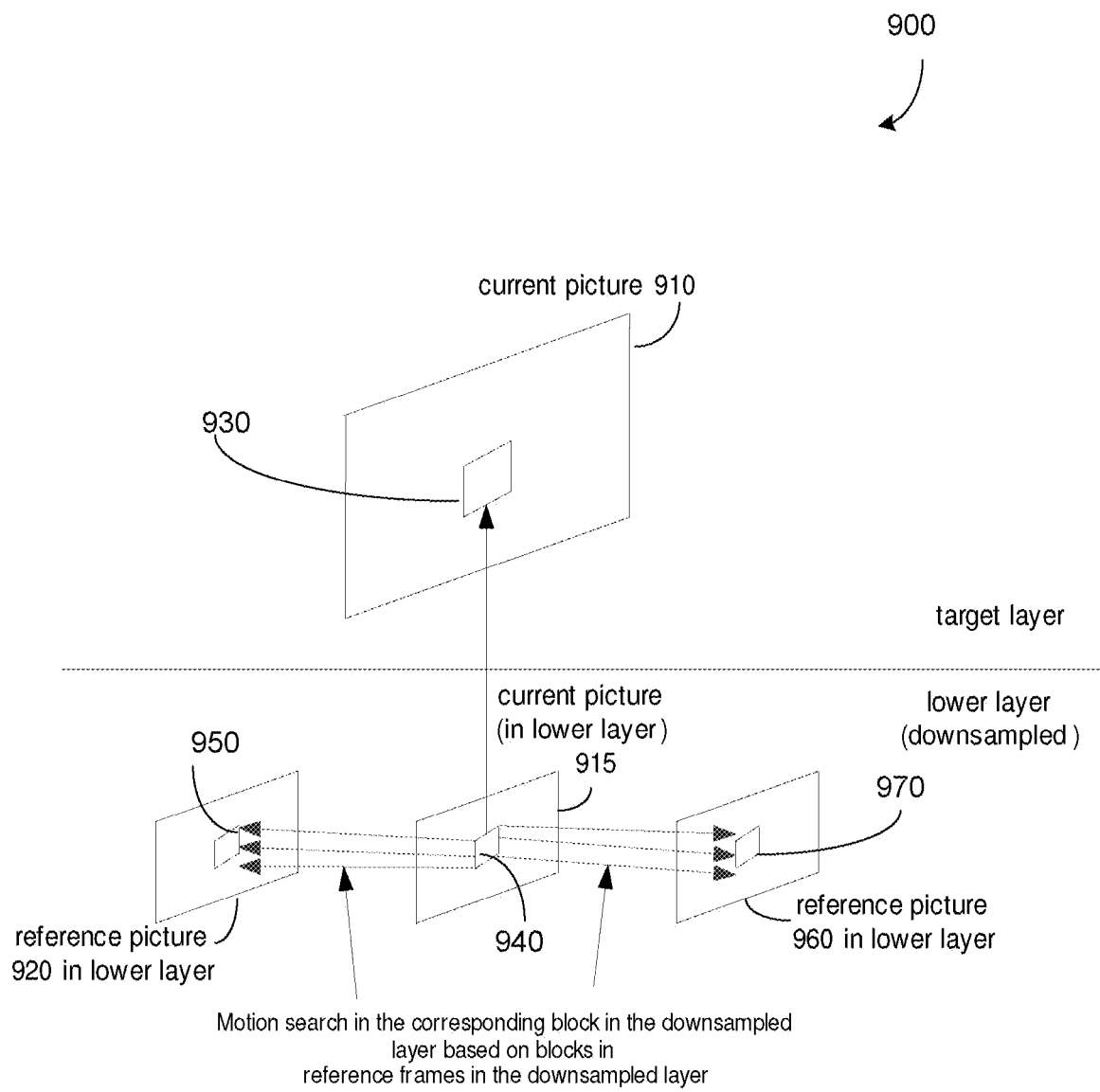
FIG. 9 illustrates MV derivation using a previously decoded block from a lower level in a layered coding context, according to an embodiment.

Already Decoded Blocks in a Downsampled Frame in a Lower Pyramid of Layered Coding In an embodiment, pixels that can be used to determine an MV for a target block may come from corresponding blocks in a lower layer whose video is downsampled from an original input in a scalable video coding scenario. FIG. 9 shows an example 900 utilizing a lower layer block 940 corresponding to the target block 930 of the current picture 910. The block 940 may occur in a picture 915 that corresponds to current picture 910. The corresponding block 940 can be used to perform the motion search, given one or more blocks 950 and 970 in respective reference pictures 920 and 960 in the lower layer. The reference pictures in the lower layer can be the forward or backward (previous or succeeding) pictures in temporal order. Since the motion vector may be derived in the downsampled layer, the motion vector may be upscaled before it is applied to the target block 930 in the target layer.

This approach may also be applied to already-decoded blocks that are spatial neighbors to the block 940 in the lower layer corresponding to the target frame 930 in the current picture 910.

Figure 10:
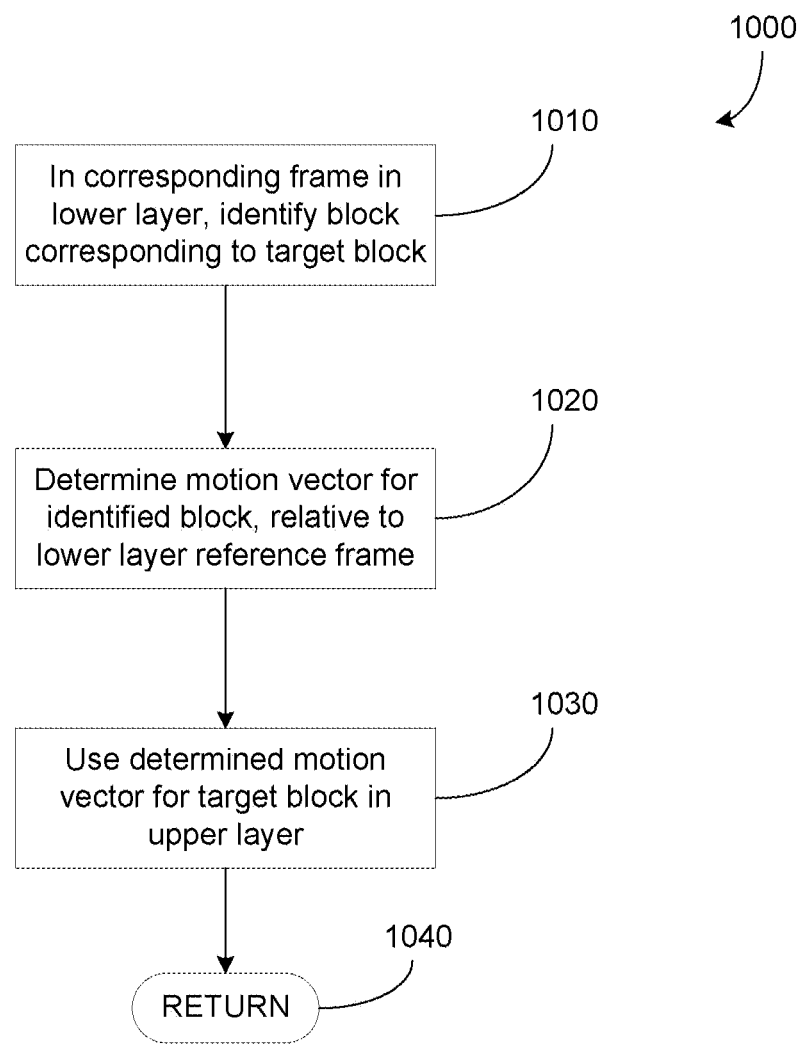
FIG. 10 is a flow chart illustrating MV derivation using a previously decoded block from a lower level in a layered coding context, according to an embodiment.

The processing of FIG. 9 is shown as a flowchart 1000 in FIG. 10. At 1010, given a target block in a current frame, a corresponding block may be identified in a corresponding frame in a lower layer. At 1020, a motion vector may be determined for the corresponding block in the lower layer, relative to one or more reference frames in the lower layer. At 1030, the determined motion vector may be used for motion estimation for the target block in the current frame. The process may conclude at 1040.

In an alternative embodiment, 1020 may precede 1010, so that the motion vector is determined at the lower layer, prior to identifying the block in the lower layer for ME purposes for the target layer.

Mode Selection

A rate distortion optimization (RDO) model may be used to determine which coding mode is selected, given the options of motion estimation at video encoder side and motion estimation at video decoder side. The RDO model for motion estimation at the video encoder may generate a cost metric, and may include the costs of both coding distortion and MV bits, and the cost function for the motion estimation at the decoder may include only the coding distortion. In an embodiment, the video encoder may compare the costs for these two motion estimation options and determine which one to pick. In an embodiment, the video encoder may identify the chosen coding mode with a flag bit during communications between the encoder and the decoder. The video decoder may then act according to the state of the flag bit. If the flag bit indicates that motion estimation at the decoder side is utilized, the video decoder may derive the motion vector autonomously.

Figure 11:
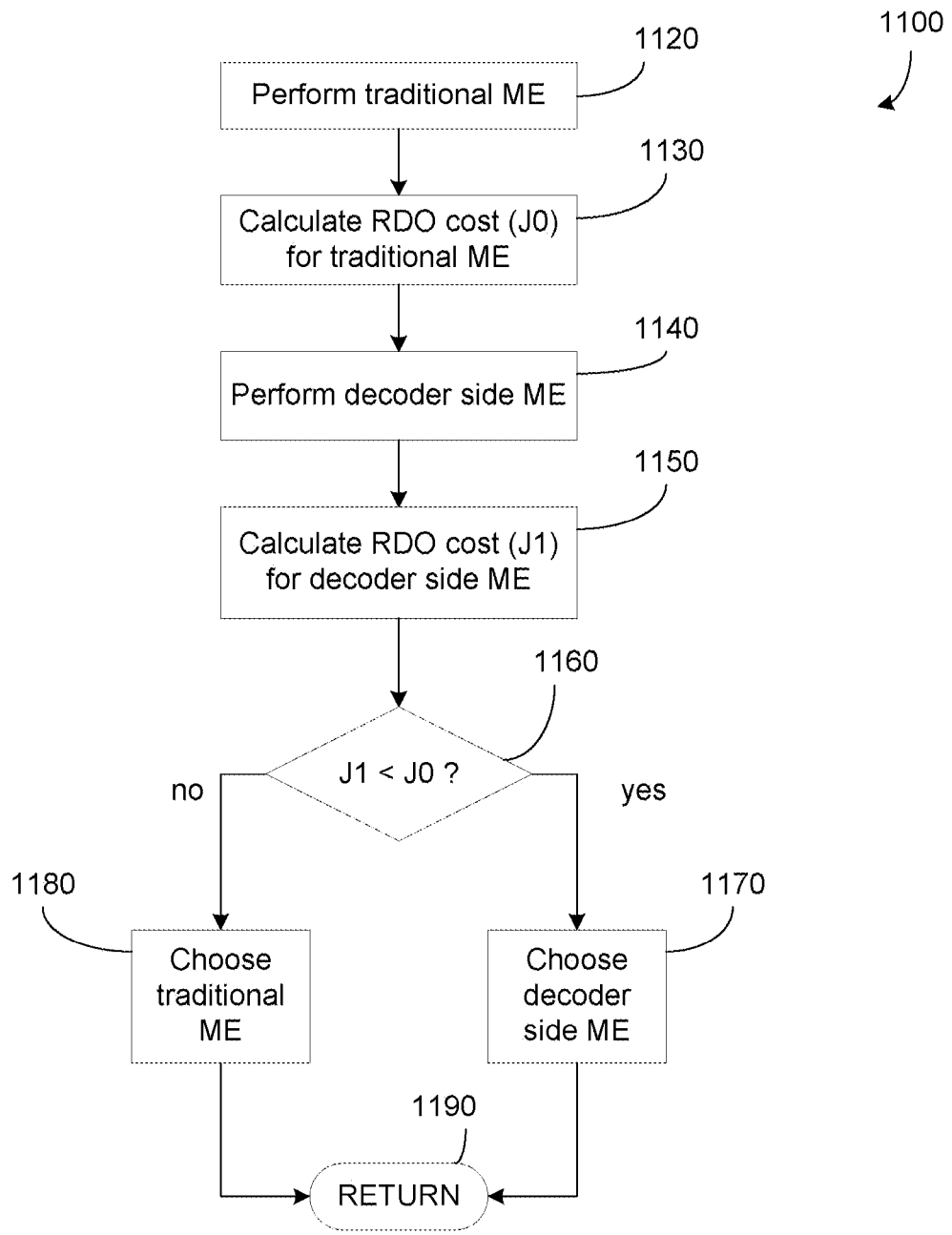
FIG. 11 illustrates a computing context of an exemplary software embodiment.

Such a mode selection process is illustrated in FIG. 11, as process 1100. At 1120, traditional encoder side motion estimation (ME) may first be performed to get an MV for this coding mode. At 1130, the corresponding RDO cost metric may be calculated. Let this cost be J0. At 1140, ME is performed at the decoder as described in any of the above embodiments, to get an MV for this coding mode. At 1150, the corresponding RDO cost metric may be calculated to be J1. At 1160, if J1<J0, then at 1170, the decoder side ME based result may be chosen. Otherwise, the result from the traditional ME based coding mode may be chosen at 1180. The process may conclude at 1190. In an alternative embodiment, more than two modes may be similarly evaluated, where the mode having the lowest RDO cost metric may be chosen. A flag can be used to signal the chosen mode in the communications between the encoder and decoder.

System

Figure 12:
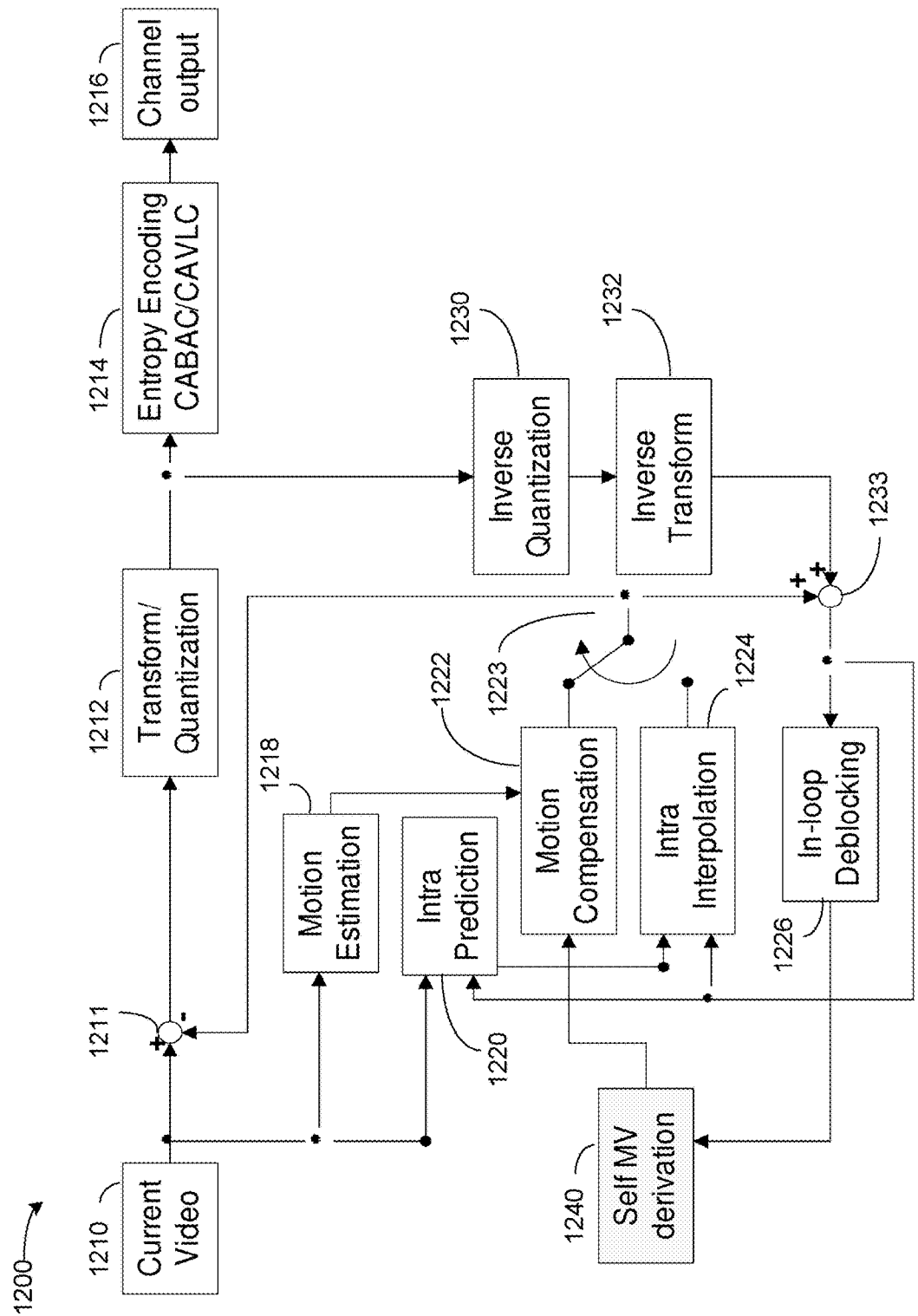
FIG. 12 is a block diagram showing a self MV derivation module in the context of a H.264 encoder, according to an embodiment.

Logic to perform the processing described above may be incorporated in a self MV derivation module that is used in a larger codec architecture. FIG. 12 illustrates an exemplary H.264 video encoder architecture 1200 that may include a self MV derivation module 1240, where H.264 is a video codec standard. Current video information may be provided from a current video block 1210 in a form of a plurality of frames. The current video may be passed to a differencing unit 1211. The differencing unit 1211 may be part of the Differential Pulse Code Modulation (DPCM) (also called the core video encoding) loop, which may include a motion compensation stage 1222 and a motion estimation stage 1218. The loop may also include an intra prediction stage 1220, and intra interpolation stage 1224. In some cases, an in-loop deblocking filter 1226 may also be used in the loop.

The current video may be provided to the differencing unit 1211 and to the motion estimation stage 1218. The motion compensation stage 1222 or the intra interpolation stage 1224 may produce an output through a switch 1223 that may then be subtracted from the current video 1210 to produce a residual. The residual may then be transformed and quantized at transform/quantization stage 1212 and subjected to entropy encoding in block 1214. A channel output results at block 1216.

The output of motion compensation stage 1222 or inter-interpolation stage 1224 may be provided to a summer 1233 that may also receive an input from inverse quantization unit 1230 and inverse transform unit 1232. These latter two units may undo the transformation and quantization of the transform/quantization stage 1212. The inverse transform unit 1232 may provide dequantized and detransformed information back to the loop.

A self MV derivation module 1240 may implement the processing described herein for derivation of a motion vector from previously decoded pixels. Self MV derivation module 1240 may receive the output of in-loop deblocking filter 1226, and may provide an output to motion compensation stage 1222.

Figure 13:
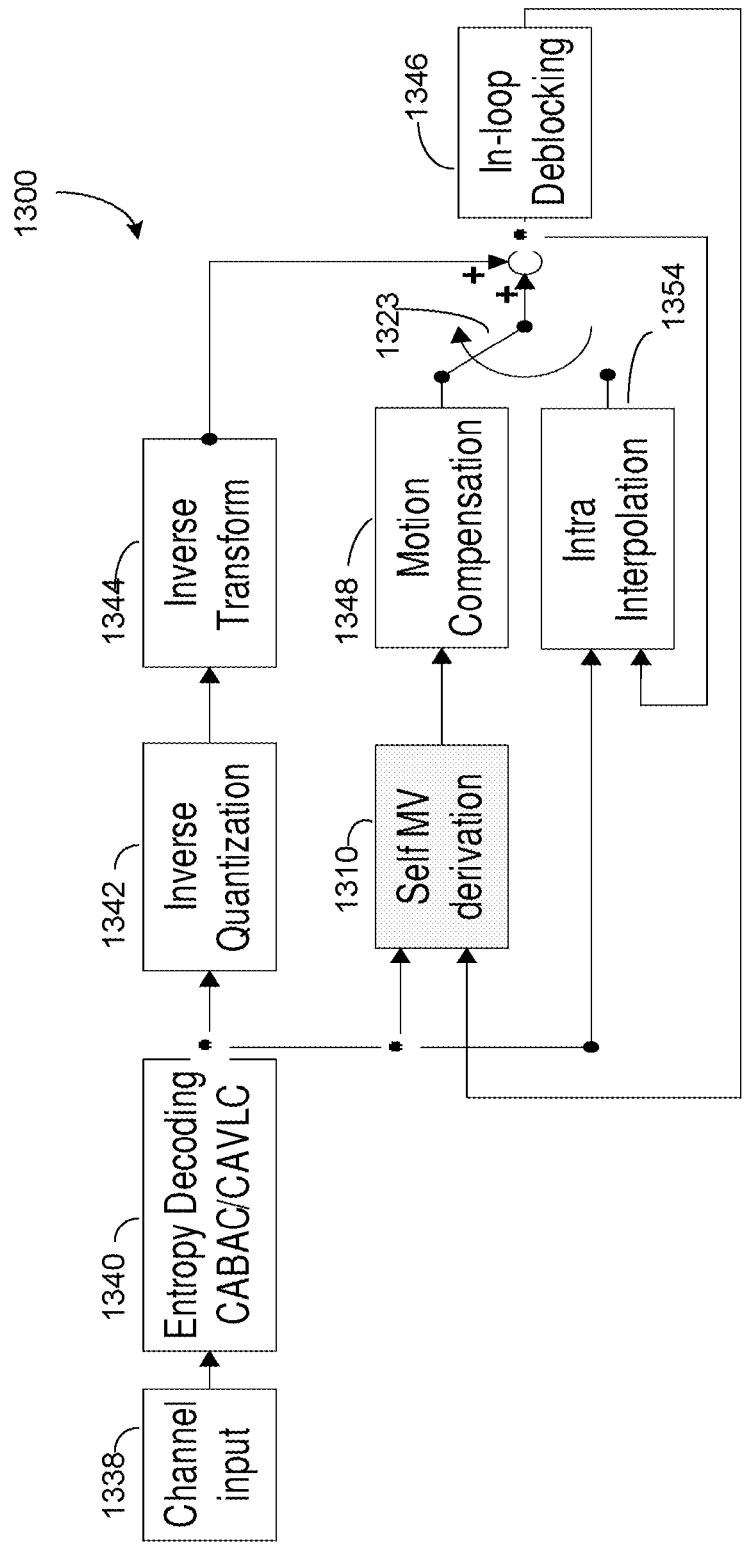
FIG. 13 is a block diagram showing a self MV derivation module in the context of a H.264 decoder, according to an embodiment.

FIG. 13 illustrates an H.264 video decoder 1300 with a self MV derivation module 1310. Here, a decoder 1300 for the encoder 1200 of FIG. 12 may include a channel input 1338 coupled to an entropy decoding unit 1340. The output from the decoding unit 1340 may be provided to an inverse quantization unit 1342 and an inverse transform unit 1344, and to self MV derivation module 1310. The self MV derivation module 1310 may be coupled to a motion compensation unit 1348. The output of the entropy decoding unit 1340 may also be provided to intra interpolation unit 1354, which may feed a selector switch 1323. The information from the inverse transform unit 1344, and either the motion compensation unit 1348 or the intra interpolation unit 1354 as selected by the switch 1323, may then be summed and provided to an in-loop de-blocking unit 1346 and fed back to intra interpolation unit 1354. The output of the in-loop deblocking unit 1346 may then be fed to the self MV derivation module 1310.

The self MV derivation module may be located at the video encoder, and synchronize with the video decoder side. The self MV derivation module could alternatively be applied on a generic video codec architecture, and is not limited to the H.264 coding architecture.

The encoder and decoder described above, and the processing performed by them as described above, may be implemented in hardware, firmware, or software, or some combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 14:
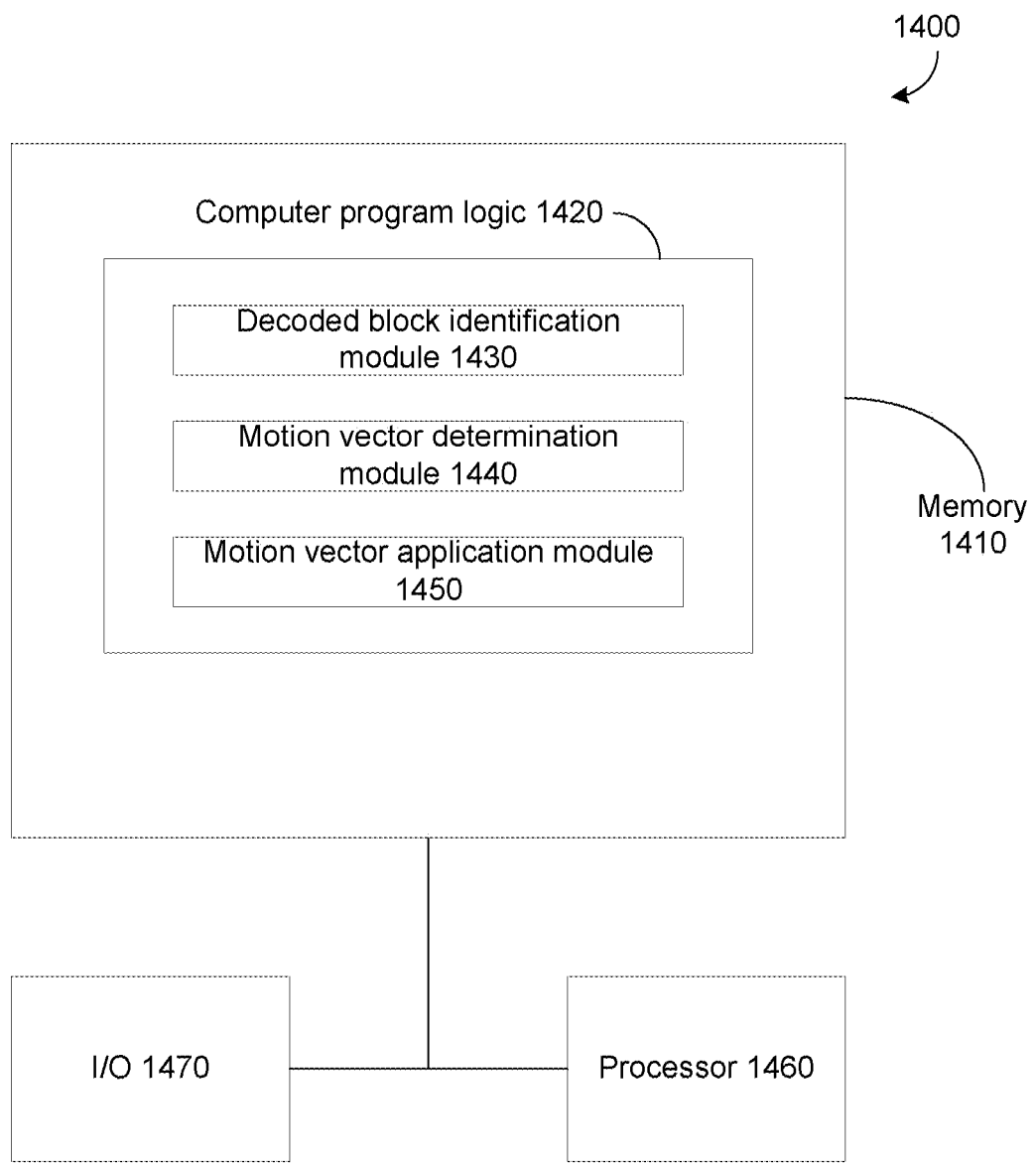
FIG. 14 is a block diagram illustrating a system, according to an embodiment.

A software or firmware embodiment of the processing described above is illustrated in FIG. 14. System 1400 may include a processor 1460 and a body of memory 1410 that may include one or more computer readable media that store computer program logic 1420. Memory 1410 may be implemented as a hard disk and drive, a removable media such as a compact disk and drive, or a read-only memory (ROM) device, for example. Processor 1460 and memory 1410 may be in communication using any of several technologies known to one of ordinary skill in the art, such as a bus. Logic contained in memory 1410 may be read and executed by processor 1460. One or more I/O ports and/or I/O devices, shown as I/O 1470, may also be connected to processor 1460 and memory 1410.

Computer program logic 1420 may include decoded block identification logic 1430. This module of computer program logic, when executed on processor 1460, identifies a block of pixels that may ultimately be used to determine a motion vector for a target block. Computer program logic 1420 may also include motion vector determination logic 1440. This module of computer program logic, when executed on processor 1460, determines a motion vector on the basis of the identified block of pixels identified by decoded block identification logic 1430, relative to one or more reference frames. Computer program logic 1420 may also include motion vector application logic 1450. This module of computer program logic, when executed on processor 1460, uses the motion vector determined by logic module 1440 to perform motion estimation for the target block.

Alternatively, any of the logic modules shown in computer program logic 1420 may be implemented in hardware.

Methods and systems are disclosed herein with the aid of functional building blocks, such as those listed above, describing the functions, features, and relationships thereof. At least some of the boundaries of these functional building blocks have been arbitrarily defined herein for the convenience of the description. Alternate boundaries may be defined so long as the specified functions and relationships thereof are appropriately performed. In addition, the encoder and decoder described above may by incorporated in respective systems that encode a video signal and decode the resulting encoded signal respectively using the processes noted above.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A video encoding method comprising:
   determining a first cost metric corresponding to motion estimation at a video decoder, the first cost metric consisting of only coding distortion for motion estimation at the video decoder;
   determining a second cost metric corresponding to motion estimation at a video encoder, the second cost metric comprising costs of coding distortion and motion vector bits for motion estimation at the video encoder;
   selecting a coding mode from motion estimation at the video decoder and motion estimation at the video encoder based on a comparison of the first and second cost metrics; and
   identifying the selected coding mode for use in video decode, wherein
   the determining the first cost metric comprises performing decoder side motion estimation and selecting a first motion vector for a first coding mode corresponding to the first cost metric, and
   the decoder side motion estimation comprises:
      selecting a first block of decoded pixels of a first reference frame, the first block corresponding to a first target block in a current frame; and
      identifying the first motion vector for the first target block based on motion estimation of a second reference frame using the first block.

2. The video encoding method of claim 1, wherein the first block is in a position in the first reference frame corresponding to a position of the first target block in the current frame, the first reference frame is temporally previous to the current frame and the second reference frame is temporally previous to the first reference frame.

3. The video encoding method of claim 1, wherein the first cost metric is based on motion compensation of the first target block using the first motion vector.

4. The video encoding method of claim 1, further comprising:
   selecting a second block of decoded pixels of a third reference frame, the second block corresponding to the first target block, wherein the first motion vector is identified further based on motion estimation of a fourth reference frame using the second block.

5. A video encoder comprising:
   a memory; and
   one or more processors in communication with the memory, the one or more processors being configured to:
   determine a first cost metric corresponding to motion estimation at a video decoder, the first cost metric consisting of only coding distortion for motion estimation at the video decoder;
   determine a second cost metric corresponding to motion estimation at a video encoder, the second cost metric comprising costs of coding distortion and motion vector bits for motion estimation at the video encoder;

select a coding mode from motion estimation at the video decoder and motion estimation at the video encoder based on a comparison of the first and second cost metrics; and identify the selected coding mode for use in video decode, wherein to determine the first cost metric, the one or more processors are further configured to perform decoder side motion estimation and select a first motion vector for a first coding mode corresponding to the first cost metric, and to perform the decoder side motion estimation, the one or more processors are further configured to:

select a first block of decoded pixels of a first reference frame, the first block corresponding to a first target block in a current frame; and identify the first motion vector for the first target block based on motion estimation of a second reference frame using the first block.

6. The video encoder of claim 5, wherein the first block is in a position in the first reference frame corresponding to a position of the first target block in the current frame, the first reference frame is temporally previous to the current frame and the second reference frame is temporally previous to the first reference frame.

7. The video encoder of claim 5, wherein the first cost metric is based on motion compensation of the first target block using the first motion vector.

8. The video encoder of claim 5, the one or more processors being further configured to:

select a second block of decoded pixels of a third reference frame, the second block corresponding to the first target block, wherein the first motion vector is identified further based on motion estimation of a fourth reference frame using the second block.

9. At least one non-transitory computer-readable medium comprising instructions stored thereon, which if executed by one or more processors, cause the one or more processors perform video encoding by:

determining a first cost metric corresponding to motion estimation at a video decoder, the first cost metric consisting of only coding distortion for motion estimation at the video decoder;

determining a second cost metric corresponding to motion estimation at a video encoder, the second cost metric comprising costs of coding distortion and motion vector bits for motion estimation at the video encoder;

selecting a coding mode from motion estimation at the video decoder and motion estimation at the video encoder based on a comparison of the first and second cost metrics; and identifying the selected coding mode for use in video decode, wherein the determining the first cost metric comprises performing decoder side motion estimation and selecting a first motion vector for a first coding mode corresponding to the first cost metric, and the decoder side motion estimation comprises:

selecting a first block of decoded pixels of a first reference frame, the first block corresponding to a first target block in a current frame; and identifying the first motion vector for the first target block based on motion estimation of a second reference frame using the first block.

10. The non-transitory computer-readable medium of claim 9, wherein the first block is in a position in the first reference frame corresponding to a position of the first target block in the current frame, the first reference frame is temporally previous to the current frame and the second reference frame is temporally previous to the first reference frame.

11. The non-transitory computer-readable medium of claim 9, wherein the first cost metric is based on motion compensation of the first target block using the first motion vector.

12. The non-transitory computer-readable medium of claim 9, wherein the instructions, if executed by the one or more processors, further cause the one or more processors to:

select a second block of decoded pixels of a third reference frame, the second block corresponding to the first target block, wherein the first motion vector is identified further based on motion estimation of a fourth reference frame using the second block.

* * * * *